US009559831B2

(12) United States Patent
Zeger et al.

(10) Patent No.: US 9,559,831 B2
(45) Date of Patent: *Jan. 31, 2017

(54) TRAFFIC BACKFILLING VIA NETWORK CODING IN A MULTI-PACKET RECEPTION NETWORK

(71) Applicant: Massachusetts Institute of Technology, Cambridge, MA (US)

(72) Inventors: Linda M. Zeger, Lexington, MA (US); Muriel Medard, Belmont, MA (US); Arman Rezaee, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,256

(22) Filed: Aug. 14, 2015

(65) Prior Publication Data

US 2015/0365222 A1 Dec. 17, 2015

Related U.S. Application Data

(63) Continuation of application No. 13/654,866, filed on Oct. 18, 2012, now Pat. No. 9,143,274.

(Continued)

(51) Int. Cl.
*H04L 5/16* (2006.01)
*H04W 72/04* (2009.01)
(Continued)

(52) U.S. Cl.
CPC .............. *H04L 5/16* (2013.01); *H04B 7/155* (2013.01); *H04L 1/0057* (2013.01);
(Continued)

(58) Field of Classification Search
None
See application file for complete search history.

(56) References Cited

U.S. PATENT DOCUMENTS 5,577,056 A 11/1996 Malik et al.
6,128,773 A 10/2000 Snider
(Continued)

FOREIGN PATENT DOCUMENTS

EP 1 638 239 A1 3/2006
WO WO 2007/109216 A1 9/2007
(Continued)

OTHER PUBLICATIONS

Response to Office Action dated Aug. 11, 2015 corresponding to U.S. Appl. No. 13/654,953; Response filed Nov. 9, 2015; 15 Pages.
(Continued)

*Primary Examiner* — Vinncelas Louis
(74) *Attorney, Agent, or Firm* — Daly, Crowley, Mofford & Durkee, LLP

(57) ABSTRACT

Network coding and multiple packet reception (MPR) are used together to improve message dissemination speed in a wireless network using half duplex communication. In at least one embodiment, MPR is used to initially distribute data packets from a number of source nodes in the network to the other nodes of the network. Network coding techniques may then be used to perform backfilling within the network to supply data packets to the source nodes that were originally missed due to the half duplex constraint.

33 Claims, 7 Drawing Sheets

Related U.S. Application Data

(60) Provisional application No. 61/553,386, filed on Oct. 31, 2011.

(51) Int. Cl.
| | |
|---|---|
| *H04W 72/10* | (2009.01) |
| *H04B 7/155* | (2006.01) |
| *H04W 28/08* | (2009.01) |
| *H04L 1/00* | (2006.01) |
| *H04W 72/12* | (2009.01) |
| *H04L 29/06* | (2006.01) |

(52) U.S. Cl.
CPC .......... *H04L 1/0075* (2013.01); *H04L 1/0076* (2013.01); *H04W 28/08* (2013.01); *H04W 72/0466* (2013.01); *H04W 72/0493* (2013.01); *H04W 72/10* (2013.01); *H04W 72/1263* (2013.01); *H04L 63/0428* (2013.01); *H04L 63/12* (2013.01)

(56) References Cited

U.S. PATENT DOCUMENTS

| | | | |
|---|---|---|---|
| 6,621,851 | B1 | 9/2003 | Agee et al. |
| 6,885,653 | B2 | 4/2005 | Choi et al. |
| 7,064,489 | B2 | 6/2006 | Price |
| 7,071,853 | B2 | 7/2006 | Price |
| 7,095,343 | B2 | 8/2006 | Xie et al. |
| 7,164,691 | B2 | 1/2007 | Knapp et al. |
| 7,283,564 | B2 | 10/2007 | Knapp et al. |
| 7,349,440 | B1 | 3/2008 | Chou et al. |
| 7,408,938 | B1 | 8/2008 | Chou et al. |
| 7,414,978 | B2 | 8/2008 | Lun et al. |
| 7,529,198 | B2 | 5/2009 | Jain et al. |
| 7,706,365 | B2 | 4/2010 | Effros et al. |
| 7,760,728 | B2 | 7/2010 | Chou et al. |
| 7,821,980 | B2 | 10/2010 | Chakrabarti et al. |
| 7,876,677 | B2 | 1/2011 | Cheshire |
| 7,912,003 | B2 | 3/2011 | Radunovic et al. |
| 7,945,842 | B2 | 5/2011 | He |
| 8,040,836 | B2 | 10/2011 | Wu et al. |
| 8,068,426 | B2 | 11/2011 | Sundararajan et al. |
| 8,130,776 | B1 | 3/2012 | Sundararajan et al. |
| 8,279,781 | B2 | 10/2012 | Lucani et al. |
| 8,451,756 | B2 | 5/2013 | Lucani et al. |
| 8,482,441 | B2 | 7/2013 | Medard et al. |
| 8,504,504 | B2 | 8/2013 | Liu |
| 8,571,214 | B2 | 10/2013 | Lima et al. |
| 9,143,274 | B2 | 9/2015 | Zeger et al. |
| 2003/0055614 | A1 | 3/2003 | Pelikan |
| 2003/0214951 | A1 | 11/2003 | Joshi et al. |
| 2004/0203752 | A1 | 10/2004 | Wojaczynski et al. |
| 2005/0010675 | A1 | 1/2005 | Jaggi et al. |
| 2005/0078653 | A1 | 4/2005 | Agashe et al. |
| 2005/0152391 | A1 | 7/2005 | Effros et al. |
| 2005/0251721 | A1 | 11/2005 | Ramesh et al. |
| 2006/0020560 | A1* | 1/2006 | Rodriguez ........... G06Q 20/401 705/75 |
| 2006/0146791 | A1 | 7/2006 | Deb et al. |
| 2006/0224760 | A1 | 10/2006 | Yu et al. |
| 2007/0046686 | A1 | 3/2007 | Keller |
| 2007/0116027 | A1 | 5/2007 | Ciavaglia et al. |
| 2007/0121618 | A1 | 5/2007 | Hirano |
| 2007/0274324 | A1 | 11/2007 | Wu et al. |
| 2008/0043676 | A1 | 2/2008 | Mousseau et al. |
| 2008/0049746 | A1 | 2/2008 | Morrill et al. |
| 2008/0123579 | A1 | 5/2008 | Kozat et al. |
| 2008/0212524 | A1 | 9/2008 | Niwano |
| 2008/0259796 | A1 | 10/2008 | Abousleman et al. |
| 2008/0291834 | A1 | 11/2008 | Chou et al. |
| 2008/0320363 | A1 | 12/2008 | He |
| 2009/0003216 | A1 | 1/2009 | Radunovic et al. |
| 2009/0073915 | A1 | 3/2009 | Zhang et al. |
| 2009/0086706 | A1 | 4/2009 | Huang et al. |
| 2009/0135717 | A1 | 5/2009 | Kamal et al. |
| 2009/0153576 | A1 | 6/2009 | Keller |
| 2009/0175320 | A1 | 7/2009 | Haustein et al. |
| 2009/0198829 | A1 | 8/2009 | Sengupta et al. |
| 2009/0207930 | A1 | 8/2009 | Sirkeci et al. |
| 2009/0238097 | A1 | 9/2009 | Le Bars et al. |
| 2009/0248898 | A1 | 10/2009 | Gkantsidis et al. |
| 2009/0285148 | A1 | 11/2009 | Luo et al. |
| 2009/0310582 | A1 | 12/2009 | Beser |
| 2009/0313459 | A1 | 12/2009 | Horvath |
| 2009/0316763 | A1 | 12/2009 | Erkip et al. |
| 2010/0014669 | A1 | 1/2010 | Jiang |
| 2010/0027563 | A1* | 2/2010 | Padhye ............ H03M 13/3761 370/474 |
| 2010/0046371 | A1 | 2/2010 | Sundararajan et al. |
| 2010/0111165 | A1 | 5/2010 | Kim et al. |
| 2010/0146357 | A1 | 6/2010 | Larsson |
| 2011/0205961 | A1 | 8/2011 | Santivanez et al. |
| 2011/0238855 | A1 | 9/2011 | Korsunsky et al. |
| 2012/0057636 | A1 | 3/2012 | Tian et al. |
| 2012/0149296 | A1 | 6/2012 | Sawai |
| 2012/0155511 | A1 | 6/2012 | Shaffer et al. |
| 2012/0218891 | A1 | 8/2012 | Sundararajan et al. |
| 2012/0300692 | A1 | 11/2012 | Sfar et al. |
| 2013/0077555 | A1 | 3/2013 | Gao et al. |
| 2013/0107764 | A1 | 5/2013 | Zeger et al. |
| 2013/0114481 | A1 | 5/2013 | Kim et al. |
| 2013/0114611 | A1 | 5/2013 | Zeger et al. |
| 2013/0195106 | A1 | 8/2013 | Calmon et al. |
| 2014/0064296 | A1 | 3/2014 | Haeupler et al. |
| 2014/0185803 | A1 | 7/2014 | Lima et al. |
| 2014/0268398 | A1 | 9/2014 | Medard et al. |
| 2014/0269485 | A1 | 9/2014 | Medard et al. |
| 2014/0269503 | A1 | 9/2014 | Medard et al. |
| 2014/0269505 | A1 | 9/2014 | Medard et al. |
| 2014/0280395 | A1 | 9/2014 | Medard et al. |
| 2014/0280454 | A1 | 9/2014 | Medard et al. |

FOREIGN PATENT DOCUMENTS

| | | |
|---|---|---|
| WO | WO 2010/005181 A2 | 1/2010 |
| WO | WO 2010/025362 A2 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
U.S. Appl. No. 14/297,090, filed Jun. 5, 2014, Kim, et al.
U.S. Appl. No. 14/678,359, filed Apr. 3, 2015, Zeger, et al.
U.S. Appl. No. 14/668,185, filed Mar. 25, 2015, Medard, et al.
Ahlswede, et al.; "Network Information Flow;" IEEE Transactions on Information Theory, vol. 46; No. 4; Jul. 2000; 13 Pages.
Ahmed, et al.; "On the Scaling Law of Network Coding Gains in Wireless Networks;" IEEE; MILCOM 2007; Oct. 2007; 7 Pages.
Celik; "Distributed MAC Protocol for Networks with Multipacket Reception Capability and Spatially Distributed Nodes;" Master's Thesis; MIT Department of Electrical Engineering and Computer Science; May 2007; 127 Pages.
Celik, et al.; "MAC for Networks with Multipacket Reception Capability and Spatially Distributed Nodes;" Proc. IEEE INFOCOM 2008; Apr. 2008; 9 Pages.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; 8 Pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; 8 Pages.

(56) References Cited

OTHER PUBLICATIONS

Cloud, et al.; "Effects of MAC approaches on non-monotonic saturation with COPE—a simple case study;" Military Communication Conference, 2011—MILCOM; Nov. 7-10, 2001; 7 Pages.
Garcia-Luna-Aceves; "Challenges: Towards Truly Scalable Ad Hoc Networks;" MobiCom 2007; Sep. 2007; 8 Pages.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; 6 Pages.
Ghez, et al.; "Stability Properties of Slotted Aloha with Multipacket Reception Capability;" IEEE Transactions on Automatic Control; vol. 33; No. 7; Jul. 1988; 10 Pages.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 Pages.
Ho, et al; "A Random Linear Network Coding Approach to Multicast;" IEEE Transactions on Information Theory; vol. 52; No. 10; Oct. 2006; 18 Pages.
Katti, et al.; "XORs in the Air: Practical Wireless Network Coding;" IEEE/ACM Transactions on Networking; vol. 16; No. 3; 2008; 14 Pages.
Le, et al.; "How Many Packets Can We Encode?—An Analysis of Practical Wireless Network Coding;" INFOCOM 2008; The $27^{th}$ Conference on Computer Communications, IEEE; 2008; 9 Pages.
Liu, et al.; "The Throughput Order of Ad Hoc Networks Employing Network Coding and Broadcasting;" Military Communications Conference; MILCOM 2006; Oct. 2006; 7 Pages.
Nyandoro, et al.; "Service Differentiation in Wireless LANs based on Capture;" IEEE GLOBECOM 2005; vol. 6; Dec. 2005; 5 Pages.
Rezaee, et.al.; "Multi Packet Reception and Network Coding;" Military Communications Conference; 2010; MILCOM 2010; IEEE; Oct. 31, 2010-Nov. 3, 2010; 6 Pages.
Rezaee; "Network Coding, Multi-Packet Reception, and Feedback: Design Tools for Wireless Broadcast Networks;" Master's Thesis; MIT Department of Electrical Engineering and Computer Science; submitted Sep. 2011; 92 Pages.
Rezaee, et al.; "Multi Packet Reception and Network Coding;" Presentation at the 2010 Military Communications Conference Unclassified Technical Program; Nov. 2, 2010; 15 Pages.
Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 Pages.
Wang, et al.; "Capacity-Delay Tradeoff for Information Dissemination Modalities in Wireless Networks;" in Information Theory; ISIT 2008; IEEE International Symposium; Jul. 2008; 5 Pages.
Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; Apr. 2008; 9 Pages.
Zhao, et al.; "A Multiqueue Service Room MAC Protocol for Wireless Networks With Multipacket Reception;" IEEE/ACM Transactions on Networking; vol. 11; No. 1; Feb. 2003; 13 Pages.
Zhao, et al.; "On analyzing and improving COPE performance;" Information Theory and Applications Workshop (ITA), Jan. 2010; 6 Pages.
"Data Service Options for Spread Spectrum Systems: Radio Link Protocol Type 3;" 3GPP2 C.S0017-010-A; Version 2.0; Sep. 2005; 56 Pages.
"Guest Editorial Wireless Video Transmission;" IEEE Journal on Selected Areas in Communications; vol. 28; No. 3; Apr. 2010; 2 Pages.
Abichar, et al.; "WiMax vs. LTE: Who Will Lead the Broadband Mobile Internet?;" Mobile Computing; IEEE Computer Society; IT Pro May/Jun. 2010; 7 Pages.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; 5 Pages.

Acedanski, et al.; "How Good is Random Linear Coding Based Distributed Network Storage?;" Proc. $1^{st}$ Workshop on Network Coding, Theory, and Applications (Netcod'05); Apr. 2005; 6 Pages.
Adamson, et al.; "Multicast Negative-Acknowledgment (NACK) Building Blocks;" Internet Engineering Task Force (IETF),RFC; vol. 5401; Nov. 2008; 42 Pages.
Adamson, et al.; "NACK-Oriented Reliable (NORM) Transport Protocol;" Internet Engineering Task Force (IETF); RFC; vol. 5740; Nov. 2009; 94 Pages.
Adamson, et al.; "Quantitative Prediction of NACK-Oriented Reliable Multicast (NORM) Feedback;" Proceedings, MILCOM 2000; vol. 2; Oct. 2002; 6 Pages.
Allman, et al.; "Fast Retransmit / Fast Recovery—TCP Congestion Control;" IETF; Section 3.2; RFC 2581; Apr. 1999; downloaded on Nov. 2, 2011; 14 pages.
Armstrong, et al.; "Distributed Storage with Communication Costs;" IEEE Forty-Ninth Annual Allerton Conference—Allerton House; Sep. 28-30, 2011; 8 Pages.
Awerbuch, et al.; "On-Line Generalized Steiner Problem;" Proceedings of the $7^{th}$ Annual ACM-SIAM Symposium on Discrete Algorithms; 1996; 12 Pages.
Baek, et al.; "The International Journal of Computer and Telecommunications Networking;" vol. 56; Issue 6; Apr. 2012; 18 Pages.
Baron, et al.; "Coding Schemes for Multislot Messages in Multichannel ALOHA With Deadlines;" IEEE Transactions on Wireless Communications; vol. 1; No. 2; Apr. 2002; 10 Pages.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; 32 Pages.
Berman, et al.; "Improved Approximations for the Steiner Tree Problem;" Journal of Algorithms; Chapter 39; 10 Pages.
Bhadra, et al.; "Looking at Large Networks: Coding vs. Queuing;" Proc. of the $25^{th}$ IEEE International Conference on Computer Communications (INFOCOM); Apr. 2006; 12 Pages.
Bharath-Kumar, et al.; "Routing to Multiple Destinations in Computer Networks;" IEEE Transactions on Communications; vol. Com-31; No. 3; Mar. 1983; 9 Pages.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; 13 Pages.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; 8 Pages.
Bonnin, et al.; "Automatic Multi-Interface Management Through Profile Handling;" Springer; Mobile Networks and Applications; Feb. 2009; 14 Pages.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; 14 Pages.
Cai, et al.; "Secure Network Coding;" IEEE; ISIT; Jun. 30-Jul. 5, 202; p. 323 (1 Page).
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; 16 Pages.

(56) References Cited

OTHER PUBLICATIONS

Castro, et al.; "Upper and Lower Error Bounds for Active Learning;" The 44'th Annual Allerton Conference on Communication, Control and Computing; vol. 2, No. 2.1; 2006, 10 pages.

Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatorial Optimization; Sep. 2005; 27 Pages.

Chakrabarti, et al.; Approximation Algorithms for the Unsplittable Flow Problem; Algorithmica (2007); Springer Science—Business Media, Aug. 2006; 16 pages.

Charikar, et al.; "Approximation Algorithms for Directed Steiner Problems;" Proceedings of the $9^{th}$ ACM-SIAM Symposium on Discrete Algorithms, 1998; 15 Pages.

Chen, et al.; "Pipeline Network Coding for Multicast Streams;" ICMU Org.; 2010; 7 pages.

Chou, et al.; "FEC and Pseudo-ARQ for Receiver-driven Layered Multicast of Audio and Video;" Data Compression Conference (DCC), 2000; Proceedings; Jan. 2000; 10 pages.

Chou, et al.; "Practical Network Coding;" Proceedings of the $41^{st}$ Annual Allerton Conference on Communication, Control, and Computing; Oct. 2003; 10 pages.

Cisco Visual Networking Index: Forecast and Methodology; 2009-2014; White Paper; Jun. 2, 2010; 17 Pages.

Cloud, et al.; "Multi-Path TCP with Network Coding;" Wireless@mit—MIT Center for Wireless Networks and Mobile Computing; 2012 Inaugural Retreat; Oct. 10-11, 2012; 1 Page.

Costa, et al.; "Informed Network Coding for Minimum Decoding Delay;" Fifth IEEE International Conference on Mobile Ad-hoc and Sensor Systems; Sep. 2008; 12 Pages.

Coughlin, et al.; Years of Destiny: HDD Capital Spending and Technology Developments from 2012-2016; IEEE Santa Clara Valley Magnetics Society; Jun. 19, 2012; 28 Pages.

Dana, et al.; "Capacity of Wireless Erasure Networks;" IEEE Transactions on Information Theory; vol. 52; No. 3; Mar. 2006; 16 Pages.

Dana, et al.; "Capacity of Wireless Erasure Networks;" Jan. 2006; 41 pages.

Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.

Deb, et al.; "On Random Network Coding Based Information Dissemination;" Proc. of the IEEE International Symposium on Information Theory (ISIT); Sep. 4-9, 2005; 5 pages.

Demers, et al.; "Epidemic Algorithms for Replicated Database Maintenance;" PODC '87 Proceedings of the sixth annual ACM Symposium on Principles of distributed computing; Jan. 1987; 12 Pages.

Dias, et al.; "Performance Analysis of HARQ in WiMax Networks Considering Imperfect Channel Estimation;" The $7^{th}$ International Telecommunications Symposium (ITS 2010); 2010; 5 pages.

Dimakis, et al.; "A Survey on Network Codes for Distributed Storage;" Proceedings of the IEEE; vol. 99; No. 3; Mar. 2011; 14 Pages.

Dimakis, et al.; "Network Coding for Distributed Storage Systems;" IEEE/ACM Transactions on Information Theory; vol. 56; No. 9; 13 Pages.

Donoho, et al.; "Estimating Covariances of Locally Stationary Processes: Rates of Convergence of Best Basis Methods;" Statistics, Stanford University, Stanford, California, USA, Tech. Rep; 1998; 64 Pages.

Effros; Distortion-Rate Bounds for Fixed-and Variable-Rate Multiresolution Source Codes; IEEE Transactions on Information Theory; vol. 45, No. 6; Sep. 1999; 24 Pages.

Effros; "Universal Multiresolution Source Codes;" IEEE Transactions on Information Theory; vol. 47; No. 6; Sep. 2001; 17 Pages.

El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; 5 Pages.

Eryilmaz, et al.; On Delay Performance Gains From Network Coding; Information Sciences and Systems; 2006 $40^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; 14 Pages.

Feizi, et al.; "Locally Adaptive Sampling;" Communication, Control, and Computing; 2010; $48^{th}$ Annual Allerton Conference, IEEE; Sep. 29, 2010; 8 Pages.

Feizi, et al.; "On Network Functional Compression;" arXiv online repository; URL: Nov. 30, 2010; 60 Pages.

Feizi, et al.; "When Do Only Sources Need to Compute? On Functional Compression in Tree Networks;" $47^{th}$ Annual Allerton Conference, IEEE; Sep. 30, 2009; 8 Pages.

Feizi, et al; "Cases Where Finding a Minimum Entropy Coloring of a Characteristic Graph is a Polynomial Time Problem;" IEEE International Symposium on Information Theory; Jun. 13, 2010; 5 Pages.

Ferner, et al.; "Toward Sustainable Networking: Storage Area Networks with Network Coding;" Fiftieth Annual Allerton Conference; IEEE; Oct. 1-5, 2012; 8 Pages.

Ford; "Architectural Guidelines for Multipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges;" MILCOM; Oct. 2007; 8 pages.

Frossard, et al.; "Media Streaming With Network Diversity;" Invited Paper; Proceedings of the IEEE; vol. 96, No. 1; Jan. 2008; 15 Pages.

Galbraith, et al.; (HGST); "Iterative Detection Read Channel Technology in Hard Disk Drives;" Whitepaper; Nov. 2008; 8 pages.

Ghaderi, et al.; Reliability Gain of Network Coding in Lossy Wireless Networks; Infocom 2008; The $27^{th}$ Conference on Computer Communications IEEE; Apr. 13-18, 2008; 5 pages.

Gheorghiu, et al.; "Multipath TCP with Network Coding for Wireless Mesh Networks;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Gkantsidis, et al.; "Cooperative Security for Network Coding File Distribution;" Proc. IEEE Infocom; Apr. 2006; 13 pages.

Gollakota, et al.; "ZigZag Decoding: Combating Hidden Terminals in Wireless Networks;" SIGCOMM 08; Aug. 17-22; 12 Pages.

Golrezaei, et al.; "FemtoCaching: Wireless Video Content Delivery Through Distributed Caching Helpers;" arXiv:1109.4179v2; Apr. 7, 2012; 11 Pages.

Grant, et al.; "Graph Implementation for Nonsmooth Convex Programs;" LNCIS 371; Springer-Verlag Limited; Jan. 2008; 16 Pages.

Gupta; "The Capacity of Wireless Networks;" IEEE Transactions on Information Theory; vol. 46; No. 2; Mar. 2000; 17 Pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. of the $43^{rd}$ Symposium on Theory of Computing (STOC); Jan. 2011, 13 pages.

Haeupler, et al.; "Optimality of Network Coding in Packet Networks;" ArXiv, Feb. 17, 2011; 5 pages.

Haley, et. al.; "Reversible Low-Density Parity-Check Codes;" IEEE Transactions on Information Theory; vol. 55; No. 5; May 2009; 21 Pages.

(56) References Cited

OTHER PUBLICATIONS

Halloush, et al.; "Network Coding with Multi-Generation Mixing: Analysis and Applications for Video Communication;" IEEE International Conference on Communications; May 19, 2008; 5 Pages.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Nework Coding for Security;" IEEE Military Communications Conference; Oct. 2007; 6 Pages.

Hassner, et al.; "4K Bye-Sector HDD-Data Format Standard;" Windows Hardware and Driver Central; San Jose, CA; Aug. 14, 2013; 5 pages.

Ho, et al.; "Byzantine Modification Detection in Multicast Networks using Randomized Network Coding;" IEEE; ISIT; Jun. 27-Jul. 2, 2004; p. 144 (1 Page).

Ho, et al.; "Network Coding from a Network Flow Perspective;" ISIT; Jun.-Jul. 2003; 6 pages.

Ho, et al.; "On Randomized Network Coding;" Proceedings of $41^{st}$ Annual Allerton Conference on Communications, Control and Computing; Oct. 2003; 10 pages.

Ho, et al.; "On the utility of network coding in dynamic environments;" International Workshop on Wireless AD-HOC Networks (IWWAN); 2004; 5 Pages.

Ho, et al.; "The Benefits of Coding over Routing in a Randomized Setting;" Proceedings of 2003 IEEE International Symposium on Information Theory; Jun. 2003; 6 Pages.

Ho, et al.; "The Benefits of Coding over Routing in a Randomized Setting;" IEEE; ISIT Jun. 29-Jul. 4, 2003; p. 442 (1 Page).

Hofri; "Disk Scheduling: FCFS vs. SSTF Revisited;" Communications of the ACM; vol. 23; No. 11; Nov. 1980; 9 Pages.

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

Jaggi, et al.; "Resilient Network Coding in the Presence of Byzantine Adversaries;" Proc. IEEE INFOCOM; May 2007; 9 pages.

Jakubczak, et al.; "One-Size-Fits-All Wireless Video;" ACM Sig-Comm Hotnets 2009; 6 pages.

Jamieson, et al.; "PPR: Partial Packet Recovery for Wireless Networks;" SIGCOMM 07; Aug. 27-31, 2007; 12 pages.

Jamieson, et al.; "PPR: Partial Packet Recovery for Wireless Networks;" Presentation; SIGCOMM 07; Aug. 27-31, 2007; 25 pages.

Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; 10 Pages.

Ji, et. al; "A network coding based hybrid ARQ algorithm for wireless video broadcast;" Science China; Information Sciences; vol. 54; No. 6; Jun. 2011; 6 Pages.

Jin, et al.; "Adaptive Random Network Coding in WiMAX;" Communications, 2008; ICC'08 IEEE International Conference on May 19-23, 2008; 5 pages.

Jin, et al.; "Is Random Network Coding Helpful in WiMax;" IEEE $27^{th}$ Conference on Computer Communications; Apr. 2008; 5 pages.

Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; 5 Pages.

Karkpinski, et al.; "New Approximation Algorithms for the Steiner Tree Problems;" Technical Report, Electronic Colloquium on Computational Complexity (ECCC) TR95-030; 1995; 17 Pages.

Karp, et al.; "Randomized Rumor Spreading;" IEEE Proceeding FOCS '00 Proceedings of the 41st Annual Symposium on Foundations of Computer Science; Jan. 2000; 10 Pages.

Katti, et al.; "XORs in the Air: Practical Wireless Network Coding;" ACM SIGCOMM '06; Computer Communications Review; vol. 36; Sep. 11-15, 2006; 12 pages.

Kempe, et al.; "Protocols and Impossibility Results for Gossip-Based Communication Mechanisms;" Foundations of Computer Science, Jan. 2002; Proceedings. The $43^{rd}$ Annual IEEE Symposium; 10 Pages.

Key, et al.; "Combining Multipath Routing and Congestion Control for Robustness;" In Proceedings of IEEE CISS, 2006, 6 pages.

Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.

Kim, et al.; "Modeling Network Coded TCP Throughput: A Simple Model and its Validation", Cornell University Library, Aug. 2010, 3 pages.

Kim, et al.; "Network Coding for Multi-Resolution Multicast;" IEEE INFOCOM 2010; Mar. 2010; 9 pages.

Kim, et al.; "Transform-free analysis of the GI/G/1/K queue through the decomposed Little's formula;" Computers and Operations Research; vol. 30; No. 3; Mar. 2003; 20 Pages.

Kim, et. al.; "Modeling Network Coded TCP Throughput: A Simple Model and its Validation", arXiv: 1008.0420v1 [cs.IT] Aug. 2, 2010; 9 pages.

Kim, et. al.; "Modeling Network Coded TCP Throughput: A Simple Model and its Validation", Nov. 2010, Presentation; 19 pages.

Kodialam, et al.; "Online Multicast Routing With Bandwidth Guarantees: A New Approach Using Multicast Network Flow;" IEEE/ACM Transactions on Networking; vol. 11; No. 4; Aug. 2003; 11 Pages.

Koetter, et al.; "An Algebraic Approach to Network Coding;" IEEE/ACM Transactions on Networking; vol. 11, No. 5; Oct. 2003; 14 Pages.

Koetter, et al.; "Beyond Routing: An Algebraic Approach to Network Coding;" IEEE Infocom; 2002; 9 pages.

Koutsonikolas, et al.; "Efficient Online WiFi Delivery of Layered-Coding Media using Inter-layer Network Coding; "Distributed Computing Systems (ICDCS); 2011 $31^{st}$ International Conference on Jun. 2011; 11 pages.

Kritzner, et al.; "Priority Based Packet Scheduling with Tunable Reliability for Wireless Streaming;" Lecture Notes in Computer Science; 2004; 11 Pages.

Kuhn, et al.; "Distributed Computation in Dynamic Networks;" Proc. of the $42^{rd}$ Symposium on Theory of Computing (STOC); Jun. 5-8, 2010; 10 pages.

Lai; "Sequential Analysis: Some Classical Problems and New Challenges"; Statistica Sinica, vol. 11, No. 2; 2001; 48 Pages.

Landau; "Application of the Volterra Series to the Analysis and Design of an Angle Track Loop;" IEEE Transactions on Aerospace and Electronic Systems; vol. AES-8, No. 3; May 1972; 13 Pages.

Larsson, et al.; "Analysis of Network Coded HARQ for Multiple Unicast Flows;" Communication (ICC) 2010 IEEE International Conference on May 23-27, 2010; 6 Pages.

Larsson, et al.; "Multi-User ARQ;" Vehicular Technology Conference; 2006; VTC (2006-Spring); IEEE $63^{rd}$; vol. 4; May 7-10, 2006; 6 Pages.

Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; 5 Pages.

Larsson; "Multicast Multiuser ARQ;" Wireless Communications and Networking Conference (WCNC) 2008; IEEE; Apr. 3, 2008; 6 Pages.

Lee, et al.; "Content Distribution in VANETs using Network Coding: The Effect of Disk I/O and Processing O/H;" Proc. IEEE SECON; Jan. 2008; 9 Pages.

(56) References Cited

OTHER PUBLICATIONS

Lehman, et al; "Complexity Classification of Network Information Flow Problems;" SODA 04' Proceedings of the fifteenth annual ACM-SIAM symposium on Discrete algorithms; Jan. 2004; 2 Pages.

Li, et al.; "N-in-1 Retransmission with Network Coding;" IEEE Transactions on Wireless Communications; vol. 9; No. 9; Sep. 2010; 6 Pages.

Li, et al.; "Robust and Flexible Scalable Video Multicast with Network Coding over P2P Network;" $2^{nd}$ International Congress on Image and Signal Processing, IEEE: Oct. 17, 2009; 5 Pages.

Li,et al.; "Linear Network Coding;" IEEE Transactions on Information Theory; vol. 49; No. 2; Feb. 2003; 11 Pages.

Lima, et al.; "An Information-Theoretic Cryptanalysis of Network Coding—is Protecting the Code Enough;" International Symposium on Information Theory and its Applications; Dec. 2008; 6 pages.

Lima, et al.; "Random Linear Network Coding: A free cipher?" IEEE International Symposium on Information Theory; Jun. 2007; 5 Pages.

Lima, et al.; "Secure Network Coding for Multi-Resolution Wireless Video Streaming;" IEEE Journal on Selected Areas in Communications; vol. 28; No. 3; Apr. 2010; 12 Pages.

Lima, et al.; "Towards Secure Multiresolution Network Coding;" IEEE Information Theory Workshop; Jun. 12, 2009; 5 Pages.

Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Presentation; Jun. 16, 2009; 17 pages.

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al; "Random Linear Network Coding for Time-Division Duplexing: Queueing Analysis;" Conference ISIT 2009, Seoul, Korea; Jul. 2009; 5 pages.

Lucani et al; "Random Linear Network Coding for Time-Division Duplexing: Field Size Considerations;" Conference: GLOBECOM 2009, Hawaii, USA; Dec. 2009; 6 pages.

Lucani, et al.; "Network Coding for Data Dissemination: It Is Not What You Know, But What Your Neighbors Don't Know;" Modeling and Optimization in Mobile, AdHoc, and Wireless Networks 2009; WiOPT 2009; $7^{th}$ International Symposium on Jun. 23-27, 2009; 8 Pages.

Lucani, et al.; "Network Coding Schemes for Underwater Networks;" WUWNet 07; Sep. 14, 2007; 8 Pages.

Lucani, et al.; Systematic Network Coding for Time-Division Duplexing; Proceedings of the IEEE International Symposium on Information Theory (ISIT); ; Jun. 13-18, 2010; 5 Pages.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; "An Analysis of Finite-Memory Random Linear Coding on Packet Streams;" Modeling and Optimization in Mobile, Ad Hoc and Wireless Networks; Apr. 3-6, 2006; 6 Pages.

Lun; "Efficient Operation of Coded Packet Networks;" Ph.D. Dissertation; Massachusetts Institute of Technology; Jun. 2006; 130 pages.

Magli, et al.; "An Overview of Network Coding for Multimedia Streaming;" IEEE International Conference; Jun. 28, 2009; 4 Pages.

Mallat, et al.; "Adaptive Covariance Estimation of Locally Stationary Processes;" Annals of Statistics, vol. 26, No. 1; 1998; 43 Pages.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the $44^{th}$ Allerton Conference on Communication, Control, and Computing; Sep. 2006; 10 pages.

Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; 7 Pages.

Metzner; "An Improved Broadcast Retransmission Protocol;" IEEE Transactions on Communications; vol. COM-32; No. 6; Jun. 1984; 5 Pages.

Mosk-Aoyama, et al.; "Information Dissemination via Network Coding;" ISIT 2006; IEEE; Jul. 9-14, 2006; 5 Pages.

Moyer, et al.; "A Survey of Security Issues in Multicast Communications;" IEEE Network; vol. 13; No. 6; Nov./Dec. 1999; 12 Pages.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59, Issue 3; DOI: 10.1007/s11265-009-0342-7; Jun. 2010; 16 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page; Mar. 21, 2011; 3 pages.

Oliveira, et al.; "A Network Coding Approach to Secret Key Distribution;" IEEE Transactions on Information Forensics and Security; vol. 3; No. 3; Sep. 2008; 10 Pages.

ParandehGheibi, et al.; "Access-Network Association Policies for Media Streaming in Heterogeneous Environments;" Apr. 2010; 8 Pages.

Peng, et al.; "Research on Network Coding based Hybrid-ARQ Scheme for Wireless Networks;" Communication Systems (ICCS); 2010 IEEE International Conference on Nov. 17-19, 2010; 5 Pages.

Popovici, et al.; "Robust, Portable I/O Scheduling with the Disk Mimic;" Proc. USENIX Annual Tech. Conf. San Antonio, Texas, Jun. 2003; 14 pages.

(56) References Cited

OTHER PUBLICATIONS

Qureshi, et al.; "An Efficient Network Coding based Retransmission Algorithm for Wireless Multicast;" Personal, Indoor and Mobile Radio Communications, 2009 IEEE 20th International Symposium on Sep. 13-16, 2009; 5 pages.
Radunovic, et al.; "Horizon: Balancing TCP Over Multiple Paths in Wireless Mesh Network;" Proc. 14th ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; 12 Pages.
Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; 7 Pages.
Rezaee, et al.; "Speeding Multicast by Acknowledgment Reduction Technique (SMART);" ArXiv:1104.2941v2 [cs.NI] Sep. 10, 2011; 6 pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; 11 Pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; 6 Pages.
Roughgarden, et al.; "How Bad is Selfish Routing?" Journal of the ACM; vol. 49, No. 2; Mar. 2002; 24 Pages.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; 3 Pages.
Sanders, et al.; "Polynomial Time Algorithms for Network Information Flow;" 15th ACM Symposium on Parallel Algorithms and Architectures; Jun. 2003; 9 Pages.
Sayenko, et al.; "Performance Analysis of the IEEE 802.16 ARQ Mechanism;" MSWiM'07; Oct. 22-26, 2007; 9 Pages.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; 19 Pages.
Sherali, et al.; "Recovery of primal solutions when using subgradient optimization methods to solve Lagrangian duals of linear programs;" Elsevier Operations Research Letters 19 (Jan. 1996); 9 Pages.
Shields; "The Interactions Between Ergodic Theory and Information Theory;" IEEE Transactions on Information Theory, vol. 44, No. 6; Oct. 1998; 15 Pages.
Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; 6 Pages.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; 11 Pages.
SongPu, et al.; Performance analysis of joint chase combining and network coding in wireless broadcast retransmission; Wireless Communication, Network and Mobile Computing 2008; WiCOM '08, 4th International Conference on Oct. 12-14, 2008; 4 Pages.
Soo Suh; "Send-On-Delta Sensor Data Transmission With a Linear Predictor;" Sensors; ISSN 1424-8220; vol. 7; No. 4; Apr. 26, 2007; 11 Pages.
Sun, et al.; "Cooperative Hybrid-ARQ Protocol with Network Coding;" Communications and Networking in China 2009—ChinaCOM 2009; Fourth International Conference on Aug. 26-28, 2009; 5 Pages.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; 5 Pages.
Sundararajan, et al.; "Network Coding Meets TCP: Theory and Implementation;" Proceedings of the IEEE; vol. 99, Issue 3; Mar. 2011; 13 Pages.
Sundararajan, et al.; "Network coding meets TCP;" InfoCOM 2009; IEEE, Apr. 19-25, 2009; 9 Pages.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; 2012; 12 Pages.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; 4 Pages.
Tosun, et al.; "Lightweight Security Mechanisms for Wireless Video Transmission;" Proc. Intl. Conference on Information Technology, Coding and Computing; Apr. 2001; 5 Pages.
Tran, et al.; "A Hybrid Network Coding Technique for Single-Hop Wireless Networks;" IEEE Journal on Selected Areas in Communications; vol. 27; No. 5; Jun. 2009; 14 Pages.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; 6 Pages.
Trung, et al.; "Quality Enhancement for Motion JPEG Using Temporal Redundancies;" IEEE Transactions on Circuits and System for Video Technology, vol. 18; No. 5; May 2008; 11 Pages.
Tsatsanis, et al.; "Network Assisted Diversity for Random Access Wireless Data Networks;" Signals, Systems & amp; Computers; IEEE; vol. 1; Nov. 1-4, 1988; 5 Pages.
Valancius, et al.; "Greening the Internet with Nano Data Centers;" Proc. 5th International Conference on Emerging Networking Experiments and Technologies; CoNEXT 2009; ACM 2009; Dec. 1-4, 2009; 12 Pages.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; 22 Pages.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.

(56) References Cited

OTHER PUBLICATIONS

Wang, et al.; Multipath Live Streaming via TCP: Scheme, Performance and Benefits; ACM Transactions on Multimedia Computing, Communications and Applications; vol. 5; No. 3; Article 25; Aug. 2009; 23 Pages.
Widmer, et al.; "Network Coding for Efficient Communication in Extreme Networks;" Applications, Technologies, Architectures, and Protocols for Computer Communication; Aug. 2005; 8 Pages.
Wieselthier, et al.; "Energy Efficient Broadcast and Multicast Trees in Wireless Networks;" Mobile Networks and Applications 7; Jan. 2002; 12 Pages.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; 16 Pages.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; 5 Pages.
Wu, et al.; "A Trellis Connectivity Analysis of Random Linear Network Coding with Buffering;" Proc. of the International Symposium on Information Theory (ISIT); Jul. 9-14, 2006; 5 Pages.
Yazdi, et al.; "Optimum Network Coding for Delay Sensitive Applications in WiMAX Unicast;" IEEE INFOCOM 2009; Apr. 19-25, 2009; 5 Pages.
Yeung; "Multilevel Diversity Coding with Distortion;" IEEE Transactions on Information Theory; vol. 41, No. 2; Mar. 1995; 11 Pages.
Yong, et al.; "XOR Retransmission in Multicast Error Recovery;" Networks 2000; ICON; Proceedings IEEE International Conference on Sep. 5-8, 2000; 5 Pages.
Yun, et al.; "High-Throughput Random Access Using Successive Interference Cancellation in a Tree Algorithm;" IEEE Transactions on Information Theory; vol. 53; No. 12; Dec. 2007; 12 Pages.
Yun, et al.; Towards Zero Retransmission Overhead: A Symbol Level Network Coding Approach to Retransmission; IEEE Transactions on Mobile Computing; vol. 10; No. 8; Aug. 2011; 13 Pages.
Zeger; "Packet Erasure Coding with Random Access to Reduce Losses of Delay Sensitive Multislot Messages;" IEEE; Paper ID #900482; Aug. 18, 2009; 8 Pages.
Zhang, et al.; "Collision Resolution in Packet Radio Networks Using Rotational Invariance Techniques;" IEEE Transactions on Communication; vol. 50; No. 1; Jan. 2002; 10 Pages.
Zhang, et al.; "Optimized Multipath Network Coding in Loss Wireless Networks;" ICDCS '08 Proceedings of the 2008 The 28$^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; 6 Pages.
Zhu, et al.; "Multicast with Network Coding in Application-Layer Overlay Networks;" IEEE Journal on Selected Areas in Communications; vol. 22; No. 1; Jan. 2004; 13 Pages.
Zeger et al, "Joint Use of Multi-Packet Reception and Network Coding for Performance Improvement;" Patent Application filed on Oct. 18, 2012 corresponding with U.S. Appl. No. 13/654,953; 34 Pages.
Zeger et al, "Traffic Backfilling Via Network Coding in a Multi-Packet Reception Network;" Patent Application filed on Oct. 18, 2012 corresponding with U.S. Appl. No. 13/654,866; 38 Pages.
Office Action dated Aug. 11, 2015 corresponding to U.S. Appl. No. 13/654,953; 57 Pages.
Office Action dated Jan. 5, 2015 for U.S. Appl. No. 13/654,866; 61 Pages.
Response to Office Action dated Jan. 5, 2015 for U.S. Appl. No. 13/654,866; Response filed on Mar. 31, 2015; 21 Pages.
Notice of Allowance dated May 22, 2015 corresponding to U.S. Appl. No. 13/654,866; 21 Pages.
312 Amendment filed on Aug. 13, 2015 corresponding to U.S. Appl. No. 13/654,866; 10 Pages.
U.S. Appl. No. 14/882,115, filed Aug. 10, 2015, Lima, et al.
U.S. Appl. No. 14/843,358, filed Sep. 2, 2015, Haupler, et al.
Office Action dated Feb. 16, 2016 for U.S. Appl. No. 13/654,953; 36 Pages.
Response to Final Office Action dated Feb. 16, 2016 corresponding to U.S. Appl. No. 13/654,953; Response filed on Aug. 12, 2016; 11 Pages.
U.S. Notice of Allowance dated Sep. 9, 2016 corresponding to U.S. Appl. No. 13/654,953; 18 Pages.

\* cited by examiner

TRAFFIC BACKFILLING VIA NETWORK CODING IN A MULTI-PACKET RECEPTION NETWORK

CROSS REFERENCE TO RELATED APPLICATION

This application is a continuation of co-pending U.S. application Ser. No. 13/654,866 filed Oct. 18, 2012 which claims the benefit of U.S. Provisional Application No. 61/553,386 filed Oct. 31, 2011 both of which are incorporated by reference herein in their entireties.

GOVERNMENT RIGHTS

This invention was made with Government support under Contract No. FA8721-05-C-0002 awarded by the U.S. Air Force. The Government has certain rights in this invention.

FIELD

Subject matter described herein relates generally to wireless communication and, more particularly, to techniques for enhancing throughput and increasing data dissemination speeds in a wireless network.

BACKGROUND

In a wireless system, bandwidth is typically a limited and expensive resource. Therefore, there is a general desire to develop communication strategies that use bandwidth efficiently. In a network scenario, bandwidth efficiently and delivery speed may be improved by increasing data dissemination speeds in the network.

SUMMARY

In accordance with one aspect of the concepts, systems, circuits, and techniques described herein, a method for distributing a plurality of data packets to nodes of a half duplex wireless network from source nodes within the network comprises: selecting a group of m source nodes to transmit in each time slot, wherein m is a multi-packet reception (MPR) capability of the wireless network; transmitting original data packets from the source nodes during first time slots until all data packets in the plurality of data packets have been transmitted, wherein transmitting data packets includes transmitting the data packets for one group per time slot and in an uncoded or coded form; and transmitting one or more coded packets from one or more non-source nodes in the wireless network during at least one second time slot, the one or more coded packets each including a linear combination of original data packets transmitted during the first time slots, to achieve backfilling for the source nodes.

In accordance with another aspect of the concepts, systems, circuits, and techniques described herein, a wireless network comprises: (a) a plurality of wireless nodes, each node in the plurality of wireless nodes including at least one wireless transceiver to support half duplex wireless communication with other wireless nodes, wherein, at a particular point in time, some of the plurality of wireless nodes may be source nodes having data packets ready for distribution to the other nodes in the network and the remainder of the plurality of wireless nodes may be non-source nodes; and (b) one or more processors to: (i) select a group of m source nodes in each time slot, wherein m is a multi-packet reception (MPR) capability of the wireless network; (ii) cause data packets to be transmitted from the source nodes during first time slots until all data packets have been transmitted, wherein the data packets are transmitted one group per time slot; and (iii) cause one or more coded packets to be transmitted from one or more non-source nodes in the wireless network during at least one second time slot, the one or more coded packets each including a linear combination of data packets transmitted during the first time slots, to achieve backfilling for the source nodes.

In accordance with still another aspect of the concepts, systems, circuits, and techniques described herein, a method for use in a wireless network that supports multi-packet reception (MPR), network coding, and half duplex communication, comprises: transmitting a data packet from a first source node during a time slot within which at least one other source node transmits at least one other data packet, wherein the at least one other data packet is not received at the first source node because of the half duplex constraint; receiving at least one coded packet during one or more later time slots at the first source node; and using the at least one coded packet and previously received original data packets transmitted by at least one source node at the first source node to recover the at least one other data packet that previously went unreceived due to the half duplex constraint.

In accordance with a further aspect of the concepts, systems, circuits, and techniques described herein, a device for use in a wireless network that supports network coding and multi-packet reception (MPR) comprises: at least one wireless transceiver having MPR capability, the at least one wireless transceiver supporting half-duplex wireless communication; a network coding module to perform network coding and/or network decoding for the wireless node device; and a controller to receive, via the at least one wireless transceiver, at least one coded packet from one or more nodes in the wireless network during a data distribution operation and to use the at least one coded packet, along with original data packets transmitted by at least one non-source node previously received during the data distribution operation, to recover one or more data packets that previously went unreceived due to the half duplex nature of the at least one wireless transceiver.

DETAILED DESCRIPTION

Techniques, devices, and systems are described herein that may be used to provide rapid distribution of packets in a wireless network using a combination of multi-packet reception (MPR) and network coding. In at least one embodiment, the techniques, devices, and systems may be implemented within a fully connected, half duplex, wireless mesh or ad-hoc network. MPR may be used to rapidly distribute the packets from a plurality of source nodes to the other nodes of the network. Network coding may then be used to provide backfilling in the network to provide packets to nodes that were transmitting when the packets were originally transmitted. The techniques, devices, and systems described herein are capable of significantly increasing packet dissemination speed within a wireless network.

A wireless mesh or ad-hoc network is a decentralized type of network that includes a number of wireless nodes that can intercommunicate through peer-to-peer wireless links. This is in contrast to an infrastructure-type wireless network where wireless nodes within a region communicate with one another, and/or with a larger network, through an associated wireless access point, base station, or other centralized control station. A wireless mesh network is a "fully connected" network if each of the nodes of the network is in communication range of each of the other nodes in the network.

Figure 1:
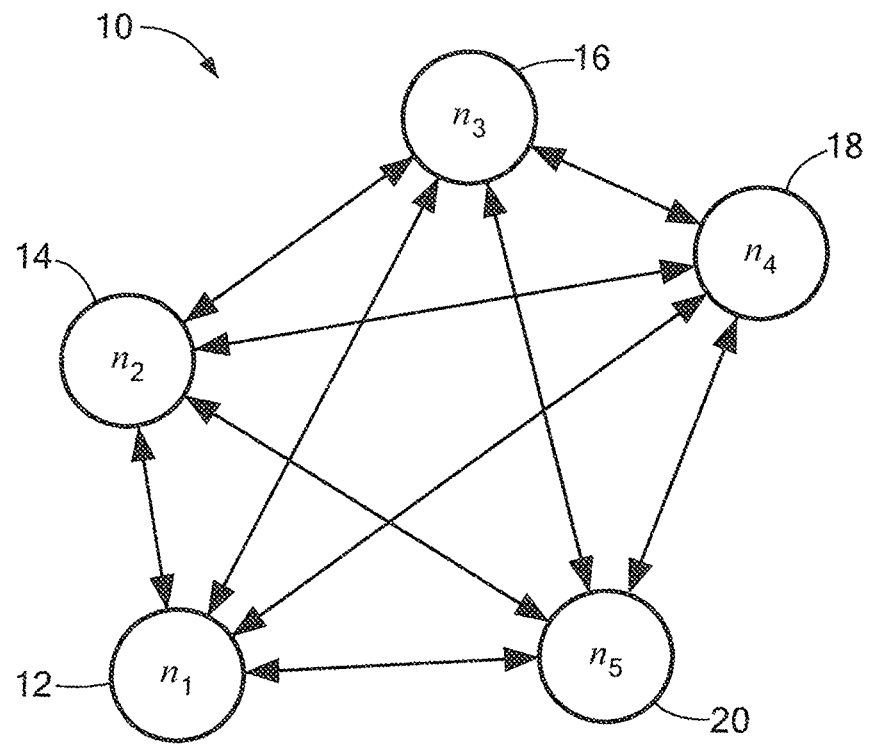
FIG. 1 is a schematic diagram illustrating an exemplary fully-connected wireless mesh network that may incorporate features described herein.

FIG. 1 is a schematic diagram illustrating an exemplary fully-connected wireless mesh network 10 that may incorporate features described herein. As shown, network 10 may include a number of wireless nodes 12, 14, 16, 18, 20 that are all within communication range of one another. The wireless nodes 12, 14, 16, 18, 20 may each include at least one wireless transceiver to support communication with the other nodes 12, 14, 16, 18, 20. Because network 10 is fully connected, transmissions from one of the nodes (e.g., node 12) can be received by each of the other nodes (e.g., nodes 14, 16, 18, 20) in the network. In some implementations, communication within the network 10 may be carried out in successive time slots. Although network 10 is shown with five nodes in FIG. 1, it should be appreciated that, in general, a wireless mesh network may include any number of nodes (i.e., N≥2 where N is the number of nodes in the network). The wireless mesh network may also be part of a network that contains infrastructure.

In some implementations, the nodes of a wireless mesh network may be operating under a half duplex constraint. In general, the phrase "duplex communication" refers to two-way communication between two nodes. Half-duplex communication is communication where a node is capable of transmitting and receiving, but not at the same time. That is, the node has to stop transmitting before it can receive signals from another node.

With reference to FIG. 1, at a particular point in time, there may be a subset of nodes in network 10 that each have one or more packets that need to be distributed to all of the other nodes in the network. For example, node 12, node 14, and node 16 may each have 3 packets that need to be distributed to all of the nodes 12, 14, 16, 18, 20 of the network 10. A goal may be to successfully transfer all of these packets to all nodes in the network in a minimal or near minimal amount of time. As used herein, the phrases "source nodes" and "transmitting nodes" will be used to refer to nodes of a network that have packets ready for distribution. The letter J will be used herein to denote the number of source nodes within a network at a particular time.

Multi-packet reception (MPR) is a technique that allows a wireless node to receive packets from multiple different sources simultaneously (e.g., within a single time slot). Various different wireless transmission technologies may be utilized to support the implementation of MPR in a wireless network including, for example, code division, multiple access (CDMA), frequency hopping spread spectrum, direct sequence spread spectrum, multiple input/multiple output (MIMO), orthogonal frequency division multiple access (OFDMA), multiple polarizations, and/or others. In one technique which will be referred to herein as heterogeneous MPR, MPR may be implemented using multiple radios operative within different frequency bands and/or following different wireless standards. The wireless standards may include, for example, two or more of IEEE 802.11, IEEE 802.15, IEEE 802.16, Bluetooth, ZigBee, Ultra wideband, third generation mobile communication standards, fourth generation mobile communication standards, satellite communications standards, wireless cellular standards, and/or others). Any of the above described MPR techniques may be used in embodiments described herein. MPR can improve throughput in a wireless network by, among other things, relieving channel contention and multi-user interference issues, reducing data loss due to collisions, and/or increasing the amount of data that can be transferred per unit of time. In many cases, special MPR-enabled receivers are needed for MPR to be successfully implemented within a network. The number of packets that an MPR-enabled device is capable of receiving simultaneously will be referred to herein as the MPR coefficient, m, of the device.

Network coding is a coding technique that encodes data by forming linear combinations of packets in a network. As described previously, in at least one embodiment, network coding is used to provide backfilling during packet dissemination operations in a wireless mesh network. Using network coding, coded packets may be distributed in a network and then decoded at destination nodes of the network. To decode one or more coded packets, a destination node must have a minimum number of degrees-of-freedom. For example, if a destination node receives a coded packet that is a linear combination of packets A, B, C, D, and E, and the destination node already knows packets A, B, C, and D, then the destination node may be able to extract packet E from the coded packet. In some cases, a destination node may need to have multiple coded packets to be able to extract desired information from the packets. For instance, in the example above, if the destination node receives a coded packet that is a linear combination of packets A, B, C, D, and E, and the destination node only has knowledge of packets A, B, and C, it will need an additional degree of freedom in order to extract packets D and E. This additional degree of freedom may be provided by, for example, another received coded packet.

In at least one implementation, random linear network coding (RLNC) techniques may be used may be used to provide backfilling in a wireless mesh network, RLNC is a form of network coding that uses randomly generated coefficients to form linear combinations of packets to be transmitted in a network. One example system and method for implementing RLNC is described in U.S. Pat. No. 7,706,365 to Effros et al. entitled "Randomized Distributed Network Coding," which is hereby incorporated by reference in its entirety.

In the discussion below, techniques are first discussed for distributing packets in a fully connected, half duplex, wireless mesh network using multi-packet reception (MPR) alone. Techniques are then discussed for distributing packets in a fully connected, half duplex, wireless mesh network using a novel combination of MPR and network coding. Two time metrics will be used to gauge the performance of the system in both of the above-described cases: (1) the total time ($T_{tot}$) required for dissemination of the source packets to all nodes in the network, and (2) the average time ($T_{avg}$) for dissemination of the packets. $T_{tot}$ will be used as a measure of the delay performance of the last node to acquire all of the packets. $T_{avg}$ will be used as a measure of the average delay performance of the network. Two other time metrics that will be used include: (1) $T_1$, the number of time slots until all of the J source nodes have transmitted their packets, and (2) $T_2$, the number of time slots to complete the backfilling after the source nodes have transmitted their packets. Other variables that will be used in the discussion that follows include: N, the number of nodes in the network; J, the number of source nodes (or transmitting nodes) in the network; k, the number of packets to be transmitted per source node; m, the MPR coefficient; and T(i) is the first time slot in which node i has received every packet. In some implementations, two conditions may be imposed regarding the size of the network. The first condition is that the number of non-source nodes in the network will not fall below the MPR coefficient (i.e., N−J≥m). The second condition is that the number of nodes in the network will be at least twice the MPR capability of the system (i.e., N≥2m).

In a wireless network, each node will have an MPR capability. The MPR capability of a node indicates the number of packets the node can simultaneously receive. In some networks, all nodes may have the same MPR capability. In others, different nodes may have different MPR capabilities. The MPR capability of a wireless network will depend on the capabilities of the nodes of the network. In at least one embodiment, the MPR capability m of a wireless network will be taken as the lowest MPR capability of the individual nodes of the network. Other techniques for defining the MPR capability of a network may alternatively be used. As used herein, the term MPR coefficient may be used interchangeably with MPR capability.

Packet distribution techniques that use MPR without network coding will now be described. To simplify the discussion, it will first be assumed that each source node in a fully connected wireless mesh network has only a single packet to be distributed (i.e., k=1 for each source node) to all of the other nodes. Since receivers are limited to m receptions per time slot, the group of transmitting nodes in any given time slot will have m or fewer nodes. In some embodiments, the groups of source nodes chosen to transmit in different time slots may overlap. In other embodiments all nodes are partitioned into disjoint groups of m nodes which transmit in different groups of time slots. In this manner, all nodes within each group can transmit simultaneously within a time slot. If the number of source nodes J is not a multiple of m, the last group of source nodes to transmit will have fewer than an nodes (i.e., J mod m nodes). The number of time slots $T_1$ that it will take for all J source nodes to transmit their packets will then be:

$$T_1 = \left\lceil \frac{J}{m} \right\rceil$$

, which represents one time slot for each group. Because of the half-duplex constraint, the source nodes will need to be backfilled to provide the packets that could not be received during transmission. Because in this embodiment transmissions occur in distinct groups of m nodes, each source node can miss a maximum of m−1 packets during its transmission slot. If the condition N−J≥m applies, the source nodes can be back-filled using m of the non-source nodes. Each group can be back-filled in one time slot and backfilling will take the same number of slots as $T_1$. The number of time slots to complete the back-filling may be expressed as follows:

$$T_2 = \left\lceil \frac{J}{m} \right\rceil u(J-1)$$

where u(J) is the unit step function defined as:

$$u(J) = \begin{cases} 0 & : J \leq 0 \\ 1 & : J > 0 \end{cases}.$$

Table 1 below shows a sample transmission schedule for a scenario where N=8, J=5, k=1, and m=2. The nodes of the network are identified in Table 1 as nodes A, B, C, D, E, F, G, and H. The source nodes are nodes A, B, C, D, and E. As shown, during first time slot $t_1$, nodes A and B each transmit their respective packets $X_A$ and $X_B$. These packets are received by all other nodes in the network. However, because nodes A and B are transmitting and the half duplex constraint applies, node A doesn't receive packet $X_B$ and node B doesn't receive packet $X_A$. During second time slot $t_2$, nodes C and D transmit their respective packets $X_C$ and $X_D$. These packets are received by all other nodes in the network, except node C doesn't receive packet $X_D$ and node D doesn't receive packet $X_C$. During third time slot $t_3$, node E transmits its packet $X_E$. This packet is received by all other nodes in the network. Because only one packet transmits during $t_3$, all nodes in the network will have packet $X_E$ at the end of $t_3$ (i.e., no packets are lost due to the half duplex constraint). This terminates the initial transmission of packets and $T_1$=3.

Backfilling is now performed to fill-in the packets that were missed during the initial transmissions due to the half duplex constraint. To perform the backfilling, non-source nodes may be employed. During fourth time slot $t_4$, nodes F and G transmit packets $X_A$ and $X_B$, respectively. Node A thus receives packet $X_B$ and node B receives packet $X_A$. Node A and B now have all transmitted packets. During fourth time slot $t_5$, nodes F and G transmit packets $X_C$ and $X_D$, respectively. Node C thus receives packet $X_D$ and node D receives packet $X_C$. Node C and D each now have all transmitted packets. This ends the packet distribution operation and $T_2$=2.

TABLE 1

| Node (i) | $t_1$ | $t_2$ | $t_3$ | $t_4$ | $t_5$ | T (i) |
|---|---|---|---|---|---|---|
| A | $X_A \rightarrow$ | $X_C, X_D$ | $X_E$ | $X_B$ | | 4 |
| B | $X_B \rightarrow$ | $X_C, X_D$ | $X_E$ | $X_A$ | | 4 |

TABLE 1-continued

| Node (i) | $t_1$ | $t_2$ | $t_3$ | $t_4$ | $t_5$ | T(i) |
|---|---|---|---|---|---|---|
| C | $X_A, X_B$ | $X_C \rightarrow$ | $X_E$ | | $X_D$ | 5 |
| D | $X_A, X_B$ | $X_D \rightarrow$ | $X_E$ | | $X_C$ | 5 |
| E | $X_A, X_B$ | $X_C, X_D$ | $X_E \rightarrow$ | | | 2 |
| F | $X_A, X_B$ | $X_C, X_D$ | $X_E$ | $X_A \rightarrow$ | $X_C \rightarrow$ | 3 |
| G | $X_A, X_B$ | $X_C, X_D$ | $X_E$ | $X_B \rightarrow$ | $X_D \rightarrow$ | 3 |
| H | $X_A, X_B$ | $X_C, X_D$ | $X_E$ | | | 3 |

The case will now be described where each source node in the network has multiple packets to be distributed (i.e., k>1 for each source node). Two separate cases will be discussed: namely, J≤m and J>m. When the number of source nodes is less than or equal to the MPR coefficient (J≤m), the MPR capability of the system cannot be fully utilized and the initial transmissions will occur in groups of J nodes per time slot. Therefore, $T_1=k$. As discussed previously, if the condition N−J≥m applies, the J source nodes can be backfilled by m of the non-source nodes. Thus:

$$T_2 = \left\lceil \frac{Jk}{m} \right\rceil u(J-1)$$

and the total completion time is:

$$T_{tot} = k + \left\lceil \frac{Jk}{m} \right\rceil u(J-1)$$

The average completion time can be upper bounded by noting that the N−J non-source nodes will have all the data by $T_1$ and the J source nodes will have every packet in at most $T_1+T_2$ time slots. Thus:

$$T_{avg} \leq k + \frac{J}{N} \left\lceil \frac{Jk}{m} \right\rceil u(J-1).$$

When the number of source nodes is greater than the MPR coefficient (J>m), m new packets can be transmitted in each time slot. This may be achieved by using all possible combinations of m source nodes. In other words, there are $$\binom{J}{m}$$

distinct groups of m out of J nodes (where $$\binom{x}{y}$$

is the combination function). Any given node is present in $$\binom{J-1}{m-1}$$

groups and is excluded from $$\binom{J-1}{m}$$

groups. If k is an integral multiple of $$\binom{J-1}{m-1},$$

then each node can transmit $$k / \binom{J-1}{m-1}$$

packets during each transmission round, and $T_1$ can be represented as:

$$T_1 = \binom{J}{m} \frac{k}{\binom{J-1}{m-1}} = \frac{Jk}{m}$$

Because of the half-duplex constraint, the J source nodes need to be backfilled. Since the transmitting groups during time $T_1$ are distinct and known to other nodes, the groups can be back-filled consecutively. The backfilling time T2 may then be expressed as:

$$T_2 = \frac{Jk}{m}$$

and the total completion time is:

$$T_{tot} = 2\left(\frac{Jk}{m}\right).$$

The average completion time may then be bounded by an upper bound as follows:

$$T_{avg} \leq \frac{(N-J)T_1 + J(T_1+T_2)}{N} \leq \frac{Jk}{m}\left(1 + \frac{J}{N}\right)$$

Packet distribution techniques that use MPR with network coding will now be described. As discussed previously, backfilling is a technique that is used to provide data packets to nodes that were not previously received due to the half duplex constraint (i.e., because the node was transmitting when the data was originally transmitted). In at least one embodiment, network coding techniques are used to provide backfilling in an MPR enabled network to improve overall throughput. Table 2 below shows a sample transmission schedule for an MPR/network coding implementation where N=8, J=5, k=1, and m=2. As in Table 1 above, the nodes of the network are identified in Table 2 as nodes A, B, C, D, F, F, G, and H. The source nodes are nodes A, B, C, D, and E. As shown, transmissions during the first three time slots $t_1$, $t_2$, and $t_3$ remain the same as in Table 1 (and $T_1$ remains unchanged). However, during time slot $t_4$, network coding is used to perform the back filling. As shown, a coded packet that includes a linear combination of all of the originally transmitted packets ($X_A$, $X_B$, $X_C$, $X_D$, and $X_E$) is transmitted during time slot $t_4$. The linear combination may take the form $\alpha_1 X_A + \alpha_2 X_B + \alpha_3 X_C + \alpha_4 X_D + \alpha_5 X_E$ where $\alpha_1$, $\alpha_2$, $\alpha_3$, $\alpha_4$, and $\alpha_5$ are coding coefficients and may be selected according to the size of the required finite field. In some embodiments, the coded packet that is transmitted may have the coefficients appended thereto, in addition to the linear combination, for use in decoding the linear combination. Because nodes A, B, C, and D each have all packets but one, they can each extract the one missing packet from the coded packet. Thus, the entire backfilling operation is performed within a single time slot in the example of Table 2 (i.e., $T_2=1$).

TABLE 2

| Node (i) | $t_1$ | $t_2$ | $t_3$ | $t_4$ | $t_5$ | T (i) |
|---|---|---|---|---|---|---|
| A | $X_A \to$ | | $X_C, X_D$ | $X_E$ | $X_B$ | 4 |
| B | $X_B \to$ | | $X_C, X_D$ | $X_E$ | $X_A$ | 4 |
| C | $X_A, X_B$ | $X_C \to$ | | $X_E$ | $X_D$ | 4 |
| D | $X_A, X_B$ | $X_D \to$ | | $X_E$ | $X_C$ | 4 |
| E | $X_A, X_B$ | | $X_C, X_D$ | $X_E \to$ | | 2 |
| F | $X_A, X_B$ | | $X_C, X_D$ | $X_E$ | $\alpha_1 X_A + \alpha_2 X_B + \alpha_3 X_C +$ $\alpha_4 X_D + \alpha_5 X_E \to$ | 3 |
| G | $X_A, X_B$ | | $X_C, X_D$ | $X_E$ | | 3 |
| H | $X_A, X_B$ | | $X_C, X_D$ | $X_E$ | | 3 |

In the example described above, each source node in the network has a single packet to transmit (i.e., k=1). The case will now be described where each source node in the network has multiple packets to be distributed (i.e., k>1 for each source node). As before, the problem will be analyzed separately for the two cases: $J \le m$ and $J > m$. First, the situation where the number of source nodes is less than or equal to the MPR coefficient ($J \le m$) will be addressed. Since network coding is only used to perform backfilling, $T_1$ will be the same as the case of MPR with no network coding (i.e., $T_1 = k$). As discussed previously, if the condition $N - J \ge m$ applies, there will be at least m nodes that did not participate in any of the previous transmissions and have received all of the JK transmitted packets. The backfilling may be accomplished by having each of these m nodes transmit a linear combination of all packets that it has received thus far. Every time these m nodes transmit, m independent coded packets are sent out and, as a result, the original J source nodes will get m new degrees of freedom in each time slot. Using this approach, backfilling will be completed in $T_2 = \lceil (J-1)k/m \rceil$ time slots. The total completion may then be expressed as:

$$T_{tot} = T_1 + T_2 = k + \left\lceil \frac{(J-1)k}{m} \right\rceil.$$

Based on the fact that all non-transmitting nodes will have every packet by $T_1$ and the J source nodes will have the data after $T_1 + T_2$ time slots, the average completion time may be calculated as $$T_{avg} = \frac{(N-J)T_1 + J(T_1 + T_2)}{N} = k + \frac{J}{N} \left\lceil \frac{(J-1)k}{m} \right\rceil.$$

An example situation where the number of source nodes is greater than the MPR coefficient, ($J \le m$), will now be discussed. As before, it will be assumed that k is an integer multiple of $$\binom{J-1}{m-1}$$

and the source nodes will transmit $$k \Big/ \binom{J-1}{m-1}$$

original packets during the first $$\binom{J}{m}$$

time slots. Thus, $T_1$ will again be:

$$T_1 = \binom{J}{m} \frac{k}{\binom{J-1}{m-1}} = \frac{Jk}{m}$$

During each transmission, m nodes will transmit simultaneously and any given node within a transmitting group will be unable to receive the packets from the other m−1 nodes. Since each node transmits k packets, each node will be missing (m−1)k packets after $T_1$. Therefore, each source node will require (m−1)k coded packets (or degrees of freedom) to retrieve the missing packets. The backfilling will then be completed in $T_2 = (m-1)k/m$ time slots. The total transmission time will then be:

$$T_{tot} = T_1 + T_2 = \frac{k}{m}(J + m - 1)$$

and the average completion time is:

$$T_{avg} = \frac{(N-J)T_1 + J(T_1 + T_2)}{N} = \frac{Jk}{m}\left(1 + \frac{m-1}{N}\right).$$

This strategy thus demonstrates how network coding can be used with MPR to reduce the total and average transmission times.

A comparison will now be made of the total and average transmission times (1) without MPR and network coding, (2) using MPR without network coding, and (3) using MPR with network coding. In practical networks, the number of source nodes is usually much greater than the MPR capability of the system. Therefore, the comparison will compare the results for the case where $J > m$. Without MPR, the total transmission time is:

$T_{tot} = Jk$, and the average transmission time is:

$$T_{avg} = Jk - \frac{k}{N}.$$

When MPR is used without network coding, the total transmission time is:

$$T_{tot} = 2\left(\frac{Jk}{m}\right),$$

and the average completion time is bounded by an upper bound as follows:

$$T_{avg} \leq \frac{Jk}{m}\left(1 + \frac{J}{N}\right).$$

When MPR is used with network coding, the total transmission time is:

$$T_{tot} = \frac{k}{m}(J + m - 1)$$

and the average completion time is:

$$T_{avg} = \frac{Jk}{m}\left(1 + \frac{m-1}{N}\right).$$

Comparing the above results, it is apparent that MPR can reduce $T_{tot}$ by a factor of m/2. However, when m=2, the total transmission time remains unchanged. By adding network coding, the total transmission time may be further reduced by a factor of 2J(J+m−1). As J increases, this factor becomes arbitrarily close to 2.

Figure 2:
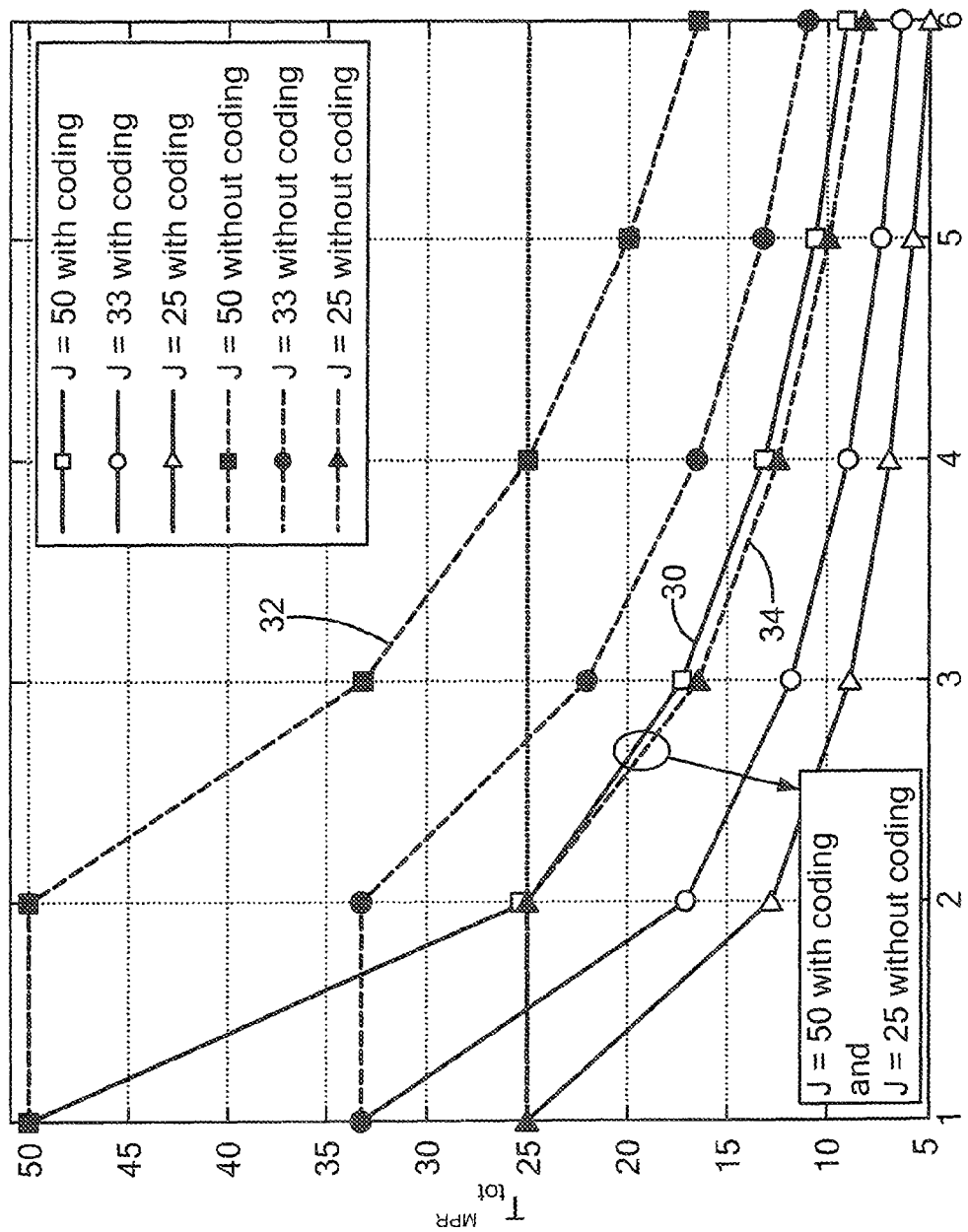
FIG. 2 is a graph illustrating how total time for all nodes to receive each packet may vary with MPR coefficient and with the total number J of source nodes in the network, with and without network coding.

FIG. 2 is a graph illustrating how $T_{tot}$ varies with MPR coefficient, with and without network coding, for various numbers of source nodes and k=1. In the figure, solid lines are used to denote the use of network coding and dashed lines are used to denote no network coding. As is evident from FIG. 2, the addition of network coding can reduce the total transmission time significantly. For example, plot 30 corresponds to a scenario where the number of source nodes is 50 and network coding is being used and plot 30 corresponds to a scenario where the number of source nodes is 50 and network coding is not being used. As shown, when m=3, the total transmission time is almost double when network coding is not being used. Plot 34 is FIG. 2 corresponds to a scenario where the number of source nodes is 25 and network coding is not being used. As shown using an ellipse in the figure, plot 34 (J=25, no network coding) closely follows plot 30 (J=50, with network coding) for m≥2, despite the fact that plot 30 involves twice as many source nodes. Thus, coding yields the same total transmission time as a network with no coding and only half the traffic. It should be noted from FIG. 2 that, when network coding is not being used, the total transmission time does not change when the MPR coefficient is increased from 1 to 2. In contrast, a significant reduction is achieved in total transmission time when the MPR coefficient is increased from 1 to 2 and network coding is being used.

As described above, FIG. 2 assumes that each source node has a single packet to transmit (i.e., k=1). In situations where k>1, if k is an integral multiple of $$\binom{J-1}{m-1}$$

as described previously, the value of $T_{tot}$ would be the value shown in FIG. 2 multiplied by k.

Figure 3:
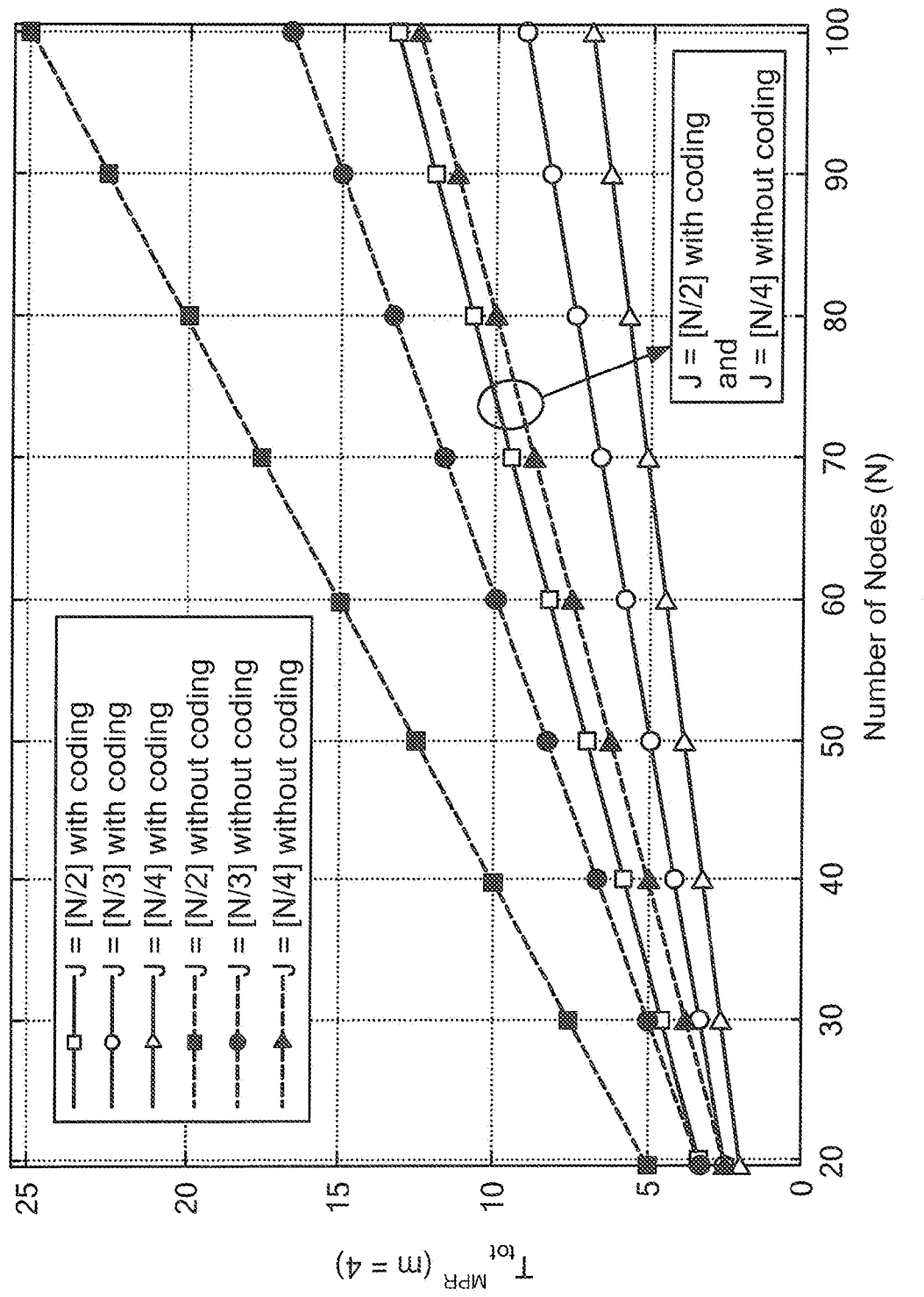
FIG. 3 is a graph illustrating how total time for all nodes to receive each packet may vary with the total number of nodes, as well as the total fraction of source nodes, with and without network coding.

FIG. 3 is a graph illustrating how $T_{tot}$ varies with number of nodes N, with and without network coding, for various numbers of source nodes, k=1, and fixed m (i.e., m=4). As in FIG. 2, solid lines denote the use of network coding and dashed lines denote no network coding. As shown, when m is fixed, $T_{tot}$ grows linearly with the number of nodes if the ratio J/N is kept constant. As shown in the FIG. 3, the total transmission time of a network with J=⌈N/2⌉ source nodes that uses network coding is only slightly higher than that of a network with J=⌈N/4⌉ source nodes that does not use network coding.

Figure 4:
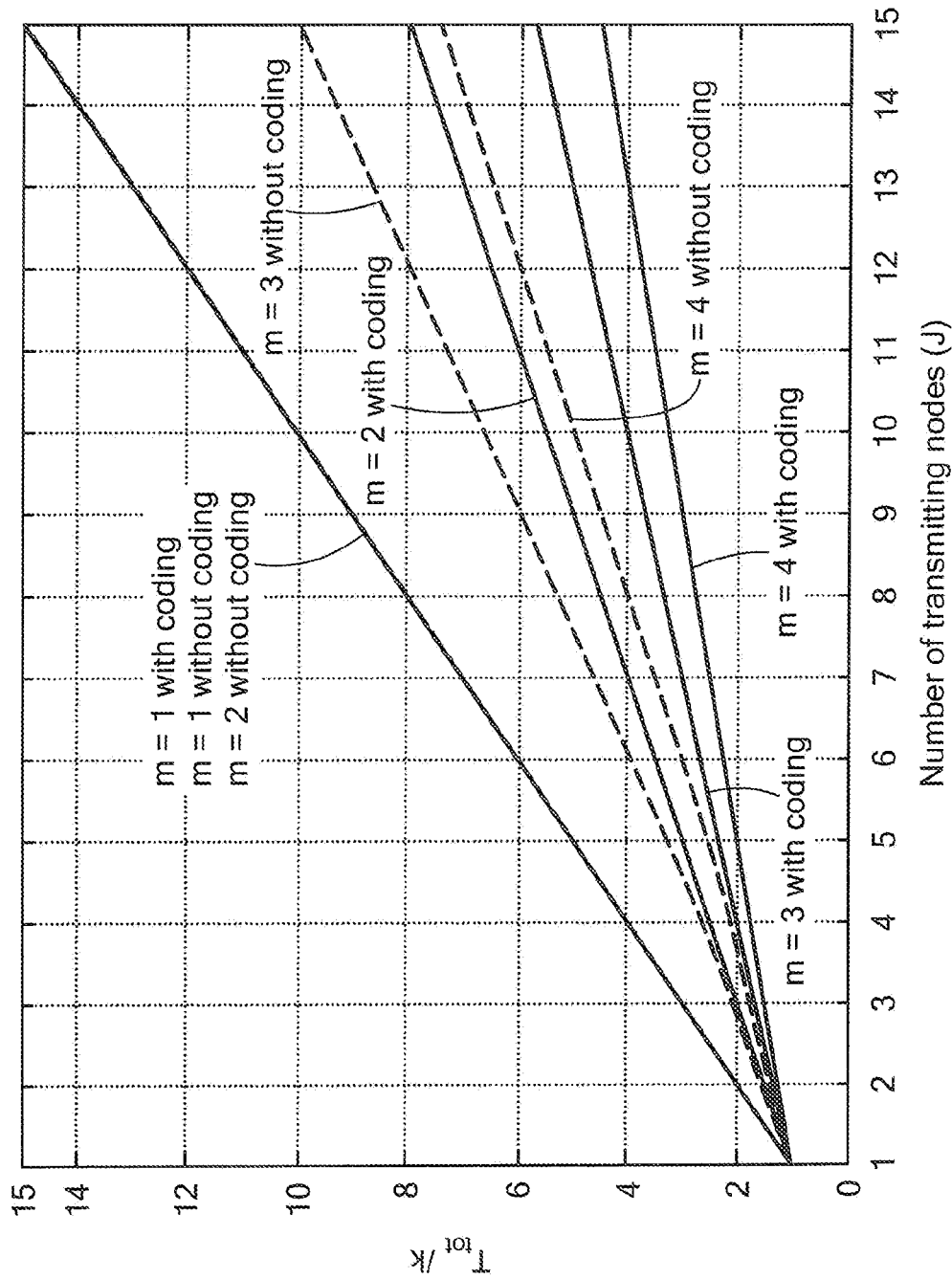
FIG. 4 is a graph illustrating how the total time for all nodes to receive each packet may vary with number of source nodes and the MPR capability, with and without network coding.

FIG. 4 is a graph illustrating how $T_{tot}$ varies with number of source nodes J, with and without network coding, for various MPR coefficients. As shown, for a given value of m, the total transmission time $T_{tot}$ increases linearly with the number of source nodes J. It should be noted that the there is some crossover in the plots in the region between J=1 and J=4. This is because J<m in this range and the behavior is governed by different equations. If the traffic comes from a fixed number of source nodes J, then the total transmission time $T_{tot}$ will not be affected by an increase in the total number of nodes N.

Figure 5:
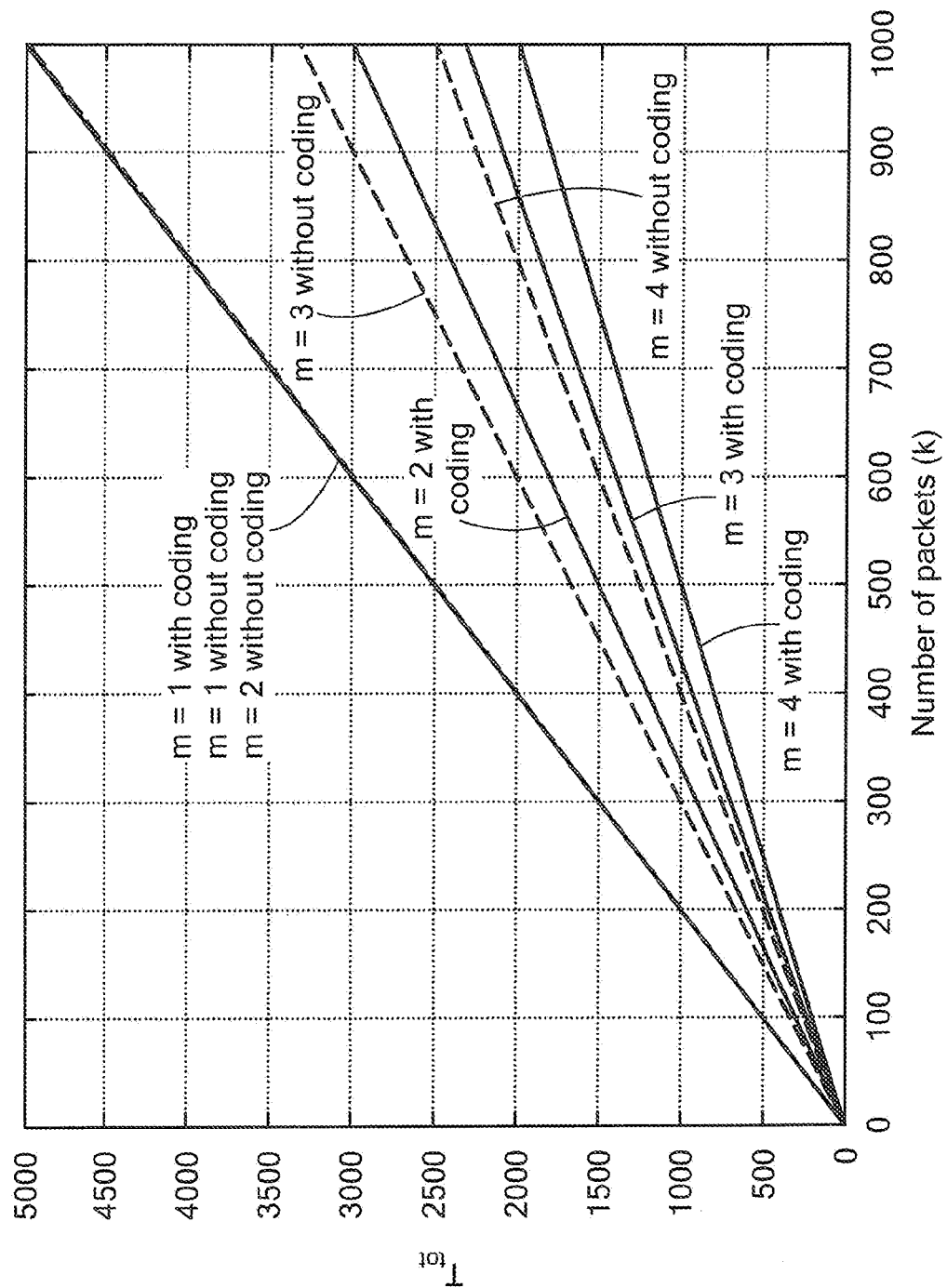
FIG. 5 is a graph illustrating how total time for all nodes to receive each packet may vary with number of packets per source node and the MPR capability, with and without network coding.

FIG. 5 is a graph illustrating how $T_{tot}$ varies with number of packets per source node k, with and without network coding, for various MPR coefficients, N=9, and J=5. As shown, for the most part, $T_{tot}$ increases linearly with the number of packets k. Thus, the amount of time saved by adding network coding when there is a fixed MPR capability is seen to increase with the number of packets k. The small discontinuities seen on each plot are caused by the integrality constraint on k (i.e., k being an integral multiple of $$\binom{J-1}{m-1}).$$

It should be appreciated that, in some implementations, k is not constrained to being an integer multiple of $$\binom{J-1}{m-1}.$$

Figure 6:
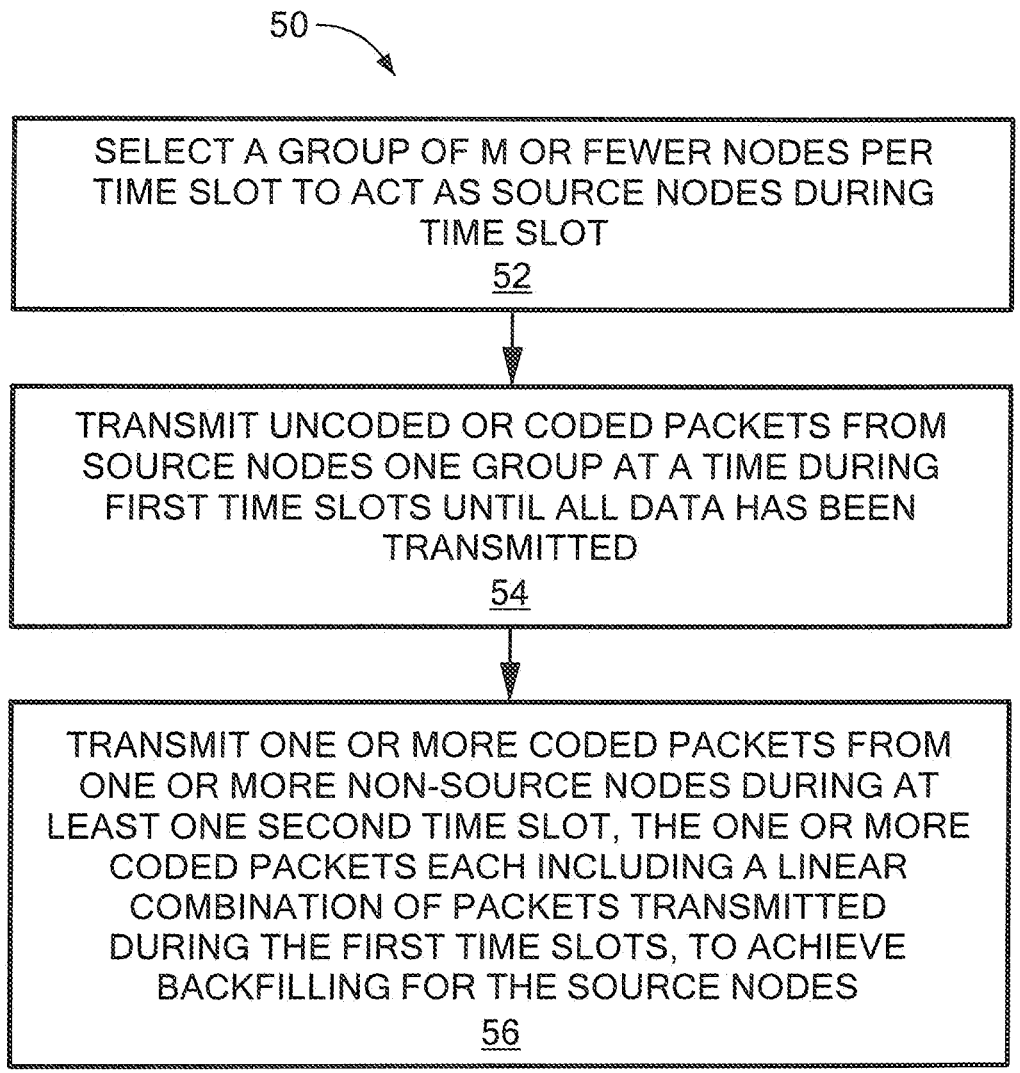
FIG. 6 is a flow diagram showing a process for distributing packets from J source nodes within a wireless network that supports both network coding and MPR in accordance with an embodiment.

FIG. 6 is a flow diagram showing a process for distributing packets from J source nodes within a wireless network uses both network coding and MPR.

The rectangular elements (typified by element 52 in FIG. 6) are herein denoted "processing blocks" and may represent computer software instructions or groups of instructions. It should be noted that the flow diagram of FIG. 6 represents one exemplary embodiment of the design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), a field programmable gate array (FPGA), and/or discrete circuits (analog or digital). Some processing blocks may be manually performed while other processing blocks may be performed by a processor, circuit, or other machine. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables, are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 6 can be performed in any convenient or desirable order.

Turning now to FIG. 6, a method 50 for distributing data packets within a wireless network having J source nodes is now described. The method 50 may be performed within the fully connected wireless mesh network 10 of FIG. 1 and/or in other wireless networks. The method 50 of FIG. 6 may be coordinated from a central location within a wireless network (e.g., a selected node, etc.) or it may be coordinated in a more distributed manner throughout a network. In at least one embodiment, the method of FIG. 6 may be implemented in the medium access control (MAC) layer of a network within, for example, a MAC controller. As described above, the wireless network will support the use of both MPR and network coding. The network will have an MPR capability of m, which may be representative of the lowest MPR capability of the various nodes in the network. In some implementations, each source node will have k packets to be distributed. In other implementations, each source node may have a different number of packets to be transmitted.

With reference to FIG. 6, in one embodiment the source nodes may first be divided into node groups that each has m nodes (block 52). Original data packets may then be transmitted from source nodes during first time slots at one group per time slot until all data packets have been transmitted (block 54). One or more coded packets may then be transmitted from one or more non-source nodes in the network during at least one second time slot, the one or more coded packets each including a linear combination of uncoded packets transmitted during the first time slots, to achieve backfilling for the source nodes (block 56). In at least one implementation, the coded packets will each include a linear combination of all uncoiled packets transmitted during the first time slots. The coded packets may also include information regarding the coefficients used to generate the linear combinations for use in decoding in some implementations.

The source nodes may be divided into node groups in a variety of different ways. For example, in one approach, source nodes may be randomly grouped together. In another approach, source nodes may be grouped based on physical position. In still another approach, nodes may be grouped based on priority (e.g., quality of service (QoS) or some other indicator of preference for nodes, users, or messages). The higher priority groups may then be scheduled to transmit before the lower priority groups. In at least one embodiment, as described above, the source nodes may be divided into $$\binom{J}{m}$$

distinct groups. Transmissions may then be performed by cycling through the $$\binom{J}{m}$$

distinct groups until all of the packets have been transmitted. If k is an integral multiple of $$\binom{J-1}{m-1},$$

then each source node can transmit $$k\binom{J-1}{m-1}$$

packets during each transmission cycle.

In embodiments where the source node can each include a different number of data packets for transmission, the number of data packets associated with each source node may be taken into consideration in defining the node groups. For example, in one possible approach, nodes groups having a similar number of packets for transmission may be grouped together. In another approach, a particular source node may be made a part of multiple groups so as to obtain maximum utilization of the MPR capability of the network. For example, if a first source node includes 5 packets for transmission, a second source node includes 4 packets for transmission, a third source node includes 3 packets for transmission, and m=2, a first group may be selected to include the first source node and the second source node. This group may transmit during four consecutive time slots. A second group may be defined that includes the first source node and the third source node. This group may transmit during the fifth consecutive time slot so that the fifth packet of the first source node is transmitted. This process may then be continued for all other source nodes until all packets have been transmitted. Other techniques for dividing up the source nodes, including combinations of the above techniques, may be used in other embodiments.

As described above, in block 54, uncoded or coded packets may be transmitted from source nodes during first time slots at one group per time slot. However, the groups do not have to transmit in any particular order. For example, in some embodiments, the transmissions may be performed in cycles through the various groups. In other embodiments, a random order through the groups may be used. In priority-based groups are used, the groups may be transmitted in priority order. As will be appreciated, many different alternatives may be used in different implementations.

In at least one embodiment, the coded packet(s) that are transmitted during the backfilling operations are generated using random linear network coding (RLNC) techniques. Using RLNC, data packets to be transmitted are linearly combined using randomly generated coefficients. In some implementations, the randomly generated coefficients may be appended to the transmit signal for use in decoding by a destination node. In some other implementations, a sender and a receiver may have synchronized or, more generally, coordinated random number generators to generate the coefficients so that the coefficients do not need to be appended to the transmit signal. Each coded packet that is transmitted may have different randomly generated coefficients.

The total number of coded packets that are transmitted during the second time slot(s) should be enough to supply the highest number of missing packets required by a source node (i.e., the highest number of degrees of freedom needed). In some implementations, each source node may have the same number of missing packets when backfilling is initiated. In other implementations, different source nodes may have different numbers of missing packets when backfilling is initiated, and it may vary according to the MPR capability of each source node.

Figure 7:
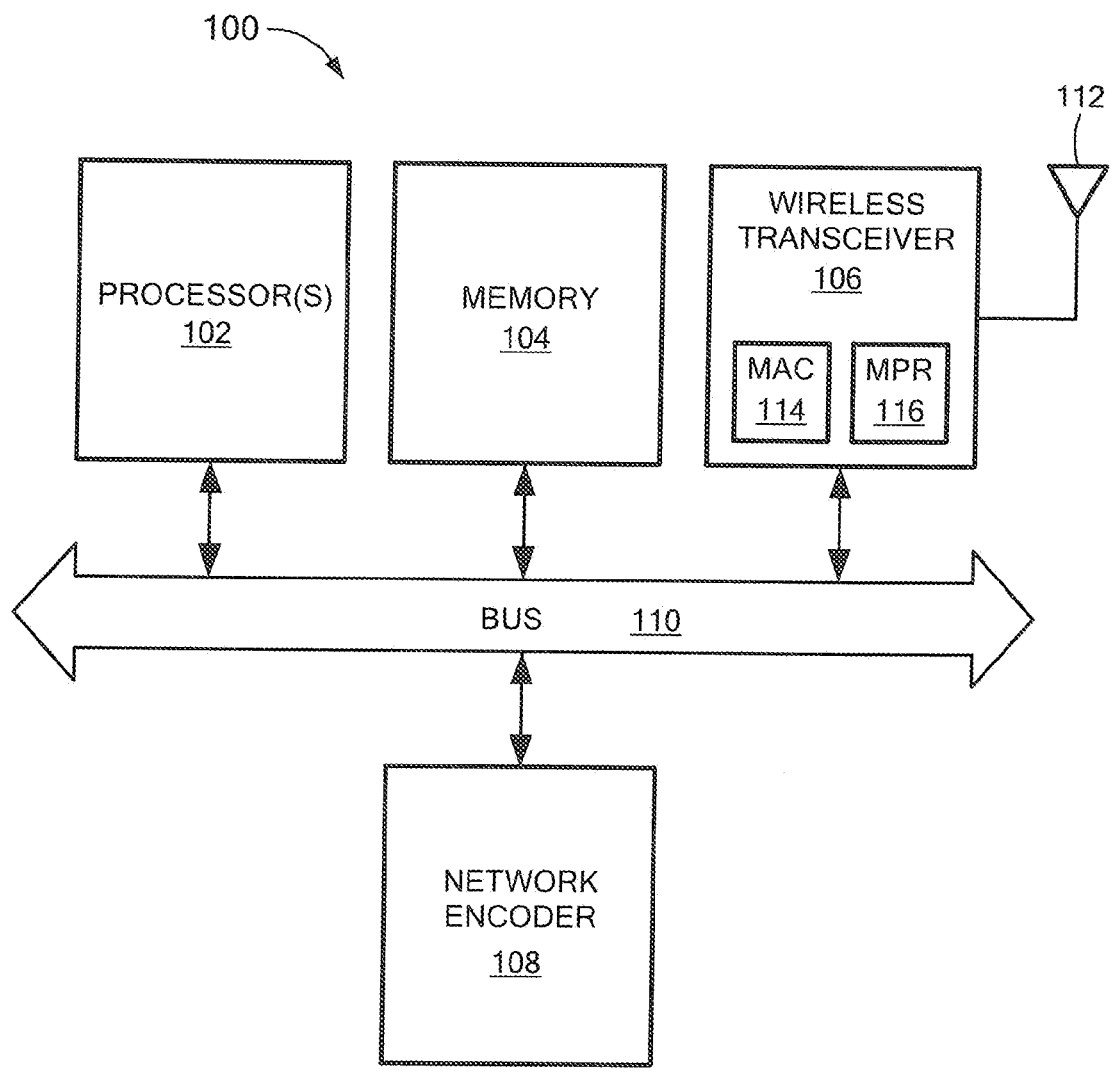
FIG. 7 is a block diagram illustrating an example wireless device architecture that may be used in accordance with an embodiment.

FIG. 7 is a block diagram illustrating an example wireless device architecture 100 that may be used for a node in a wireless mesh network in accordance with an embodiment. As illustrated, the wireless device architecture 100 may include: one or more digital processors 102, a memory 104, one or more wireless transceivers 106, and a network coding module 108. A bus 110 and/or one or more other transmission structures may be provided for establishing interconnections between various components of the architecture 100. The wireless transceiver(s) 106 may be coupled to one or more antennas 112 and/or other transducers to facilitate the transmission and/or reception of wireless signals.

Digital processor(s) 102 may include one or more digital processing devices that are capable of executing programs to provide one or more functions and/or services to a user. Digital processor(s) 102 may be used to, for example, execute an operating system of a corresponding wireless device. Digital processor(s) 102 may also be used to, for example, execute user application programs. In addition, digital processor(s) 102 may be used to implement, either partially or fully, one or more of the processes or techniques described herein. Digital processor(s) 102 may include any type of digital processing device including, for example, a general purpose microprocessor, a digital signal processor (DSP), a controller, a microcontroller, an application specific integrated circuits (ASIC), a field programmable gate array (FPGA), a programmable logic array (PLA), a programmable logic device (PLD), a reduced instruction set computer (RISC), and/or others, including combinations of the above.

Wireless transceiver(s) 206 may include any type of transceiver that is capable of supporting wireless communication with one or more remote wireless entities. In various implementations, wireless transceiver 206 may be configured in accordance with one or more wireless networking standards and/or wireless cellular standards. In some implementations, multiple wireless transceivers may be provided to support operation with different networks or systems in a surrounding environment. In addition, in some implementations, multiple wireless transceivers may be provided to support the use of heterogeneous MPR. As illustrated in FIG. 7, in some implementations, wireless transceiver 106 may include a medium access control (MAC) module 114 to facilitate medium access operations on an associated wireless network medium or channel. In some embodiments, some (or all) of the MAC functionality may be provided in digital processor(s) 102. In addition, in some implementations, wireless transceiver(s) 106 may include a multi-packet reception (MPR) module 116 to facilitate the use of MPR by a corresponding wireless device. In at least one embodiment, MPR module 116 is capable of supporting heterogeneous MPR using two different receivers in wireless transceiver(s) 106.

Memory 104 may include any type of structure that is capable of storing digital information. The digital information may include, for example, digital user data, computer executable instructions and/or programs, or any other type of data. In some implementations, memory 104 may be used to, for example, store data packets and/or coded packets that are ready for transmission into a wireless network. Memory 104 may include, for example, magnetic data storage devices, disc based storage devices, optical storage devices, semiconductor memories, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or others.

Network coding module 108 is operative for performing network coding operations and/or network decoding operations for the mobile device. In some implementations, network coding module 108 may be called upon to, for example, generate coded packets by linearly combining other data packets. In some implementations, network coding module 108 may combine packets using an exclusive-OR function, such as used in COPE. However, in other implementations, other or additional forms of network coding may be implemented within network coding module 108 such as, for example, random linear network coding (RLNC). Although illustrated as a separate unit in FIG. 7, it should be appreciated that, in some implementations, network coding module 108 may be implemented within digital processor(s) 102.

It should be appreciated that the mobile device architecture 100 of FIG. 7 represents one possible example of an architecture that may be used in an implementation. Other architectures may alternatively be used. It should also be appreciated that all or part of the various devices, processes, or methods described herein may be implemented using any combination of hardware, firmware, and/or software.

Features described herein can be implemented in a variety of different forms. For example, features may be embodied within laptop, palmtop, desktop, and tablet computers with or without wireless capability; smart phones; cellular telephones; personal digital assistants (PDAs); satellite communicators; satellite-based transceivers; pagers; airborne transceivers residing on, for example, aircraft, helicopters, etc.; maritime transceivers; network interface cards (NICs) and other network interface structures; base stations; wireless access points; television sets; set top boxes; audio/video devices; sensors; cameras and other imaging devices; appliances having wireless capability; integrated circuits; as instructions and/or data structures stored on non-transitory computer readable media; and/or in other formats. Examples of different types of computer readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

Having described preferred embodiments which serve to illustrate various concepts, structures, and techniques which are the subject of this patent, it will now become apparent to those of ordinary skill in the art that other embodiments incorporating these concepts, structures, and techniques may be used. Accordingly, it is submitted that that scope of the patent should not be limited to the described embodiments, but rather should be limited only by the spirit and scope of the following claims.

What is claimed is:

1. A method for distributing a plurality of data packets to nodes in a half duplex wireless network from source nodes within the wireless network, wherein the data packets are transmitted in time slots within the wireless network, the method comprising:
   selecting a group of m or fewer nodes in each time slot, wherein m is a multi-packet reception (MPR) capability of the wireless network, to act as source nodes during that time slot;
   transmitting original data packets from the source nodes during first time slots until all of the data packets in the plurality of data packets have been transmitted, wherein transmitting the original data packets includes transmitting the data packets for one group per time slot and in an uncoded or coded form;
   transmitting one or more coded packets from one or more non-source nodes in the wireless network during at least one second time slot, the one or more coded packets each including a linear combination of the original data packets transmitted by the source nodes during the first time slots; and
   receiving at least one coded packet of the one or more coded packets transmitted from the one or more non-source nodes during the at least one second time slot at a first source node and using the at least one coded packet to recover at least one of the original data packets at the first source node that previously went unreceived because the first source node was transmitting when the at least one original data packet was originally transmitted by another source node of the source nodes during one of the first time slots.

2. The method of claim 1, wherein:
   the one or more coded packets transmitted from non-source nodes each include a linear combination of all of the original data packets transmitted during the first time slots.

3. The method of claim 2, wherein:
   the one or more coded packets transmitted from non-source nodes each include a linear combination of all of the original data packets transmitted during the first time slots, weighted with a plurality of randomly generated coefficients.

4. The method of claim 1, wherein:
   selecting a group of nodes at each time slot includes dividing the source nodes into groups of m nodes by dividing the source nodes into $$\binom{J}{m}$$

distinct groups, where J is a quantity of the source nodes and $$\binom{x}{y}$$

is the combination function, where x is a total number of the source nodes and y is a number of the source nodes in each of the $$\binom{J}{m}$$

distinct groups.

5. The method of claim 4, wherein:
   transmitting the original data packets from the source nodes during first time slots includes transmitting the original data packets by cycling through the $$\binom{J}{m}$$

distinct groups until all of the data packets in the plurality of data packets have been transmitted.

6. The method of claim 1, wherein:
   selecting a group of source nodes includes dividing the source nodes into groups based, at least in part, on priority.

7. The method of claim 1, wherein;
   selecting a group of source nodes includes dividing the source nodes into groups based, at least in part, on a number of data packets to be transmitted from each source node.

8. The method of claim 1, wherein:
   each source node within the wireless network includes an equal number of data packets to be transmitted.

9. The method of claim 1, wherein:
   transmitting the one or more coded packets from the one or more non-source nodes in the wireless network during the at least one second time slot includes transmitting one coded packet from each of multiple non-source nodes during a single time slot of the at least one second time slot.

10. The method of claim 1, wherein:
    transmitting the one or more coded packets from the one or more non-source nodes in the wireless network during the at least one second time slot includes transmitting one coded packet from each of m or fewer non-source nodes during a single time slot of the at least one second time slot.

11. The method of claim 1, wherein:
    transmitting the one or more coded packets from the one or more non-source nodes in the wireless network during the at least one second time slot includes transmitting a total number of coded packets that is at least as large as a maximum number of missing data packets required by a selected source node of the source nodes.

12. The method of claim 1, wherein:
    the wireless network is a wireless mesh network.

13. The method of claim 1, wherein the groups of nodes selected as the source nodes in each time slot can include the same node in more than one group.

14. The method of claim 1, wherein the wireless network includes a plurality of non-source nodes and receiving at least one coded packet includes receiving a plurality of coded packets from two or more of the plurality of the non-source nodes during a single time slot of the second time slot.

15. A wireless network comprising:
a plurality of wireless nodes, each node in the plurality of wireless nodes including at least one wireless transceiver to support half duplex wireless communication with other wireless nodes in the plurality of nodes, wherein, at a particular point in time, some of the plurality of wireless nodes may be source nodes having data packets ready for distribution to the other nodes in the wireless network and the remainder of the plurality of wireless nodes may be non-source nodes; and
one or more processors to:
  select a group of m or fewer source nodes at each time slot, wherein m is a multi-packet reception (MPR) capability of the wireless network;
  cause data packets to be transmitted from the source nodes during first time slots until all data packets have been transmitted, wherein the data packets are transmitted one group per time slot; and
  cause one or more coded packets to be transmitted from one or more of the non-source nodes in the wireless network during at least one second time slot, the one or more coded packets each including a linear combination of data packets transmitted during the first time slots;
  wherein a first source node in the plurality of wireless nodes is configured to receive at least one coded packet of the one or more coded packets transmitted from the one or more non-source nodes during the at least one second time slot and use the at least one coded packet to recover at least one original data packet at the first source node that previously went unreceived because the first source node was transmitting when the at least one original data packet was originally transmitted by another source node of the source nodes during one of the first time slots.

16. The wireless network of claim 15, wherein:
the one or more coded packets each include a linear combination of all of the data packets transmitted during the first time slots.

17. The wireless network of claim 15, wherein:
the one or more coded packets each include a linear combination of all of the data packets transmitted during the first time slots weighted with a plurality of randomly generated coefficients.

18. The wireless network of claim 15, wherein:
the one or more processors are configured to divide the source nodes into $$\binom{J}{m}$$

distinct groups, where J is a quantity of the source nodes and $$\binom{x}{y}$$

is the combination function, where x is a total number of the source nodes and y is a number of the source nodes in each of the $$\binom{J}{m}$$

distinct groups.

19. The wireless network of claim 18, wherein:
the one or more processors are configured to cause the data packets to be transmitted from the source nodes during the first time slots by cycling though the $$\binom{J}{m}$$

distinct groups until all of the data packets in the plurality of data packets have been transmitted.

20. The wireless network of claim 15, wherein:
the one or more processors are configured to select each group of source nodes based, at least in part, on priority.

21. The wireless network of claim 15, wherein:
the one or more processors are configured to select each group of source nodes based, at least in part, on a number of the data packets to be transmitted from each source node.

22. The wireless network of claim 15, wherein:
the one or more processors are configured to cause one coded packet to be transmitted from each of multiple non-source nodes during the at least one second time slot.

23. The wireless network of claim 15, wherein:
the one or more processors are configured to cause one coded packet to be transmitted from each of m or fewer non-source nodes during the at least one second time slot.

24. The wireless network of claim 15, wherein:
the one or more processors are configured to cause a total number of coded packets to he transmitted from the non-source nodes that is at least as large as a highest number of missing data packets required by a selected source node of the source nodes.

25. The wireless network of claim 15, wherein:
the wireless network is a wireless mesh network.

26. The wireless network of claim 15, wherein:
the one or more processors are located at a single network location.

27. The wireless network of claim 15, wherein:
the one or more processors include multiple processors distributed across multiple network locations.

28. A method for use in a wireless network that supports multi-packet reception (MPR), network coding, and half duplex communication, the method comprising:
  transmitting a data packet from a first source node of a plurality of source nodes during a time slot within which at least one other source node of the plurality of source nodes transmits at least one other data packet, wherein the at least one other data packet is not received at the first source node because of the half duplex constraint and the source nodes are divided into groups based on priority;
  receiving at least one coded packet transmitted by at least one non-source node, which is a linear combination of data packets previously transmitted by one or more of the source nodes, during one or more later time slots at the first source node; and
  using the at least one coded packet and previously received original data packets at the first source node to recover the at least one other data packet that previously went unreceived due to the half duplex constraint.

29. The method of claim 28, wherein:
the at least one coded packet includes a first coded packet comprising a linear combination of the original data packets previously transmitted by one or more of the source nodes during a common data distribution operation.

30. The method of claim 28, wherein:
receiving at least one coded packet includes receiving m coded packets during a time slot, where m is the MPR capability of the wireless network.

31. A device for use in a wireless network that supports network coding and multi-packet reception (MPR), wherein data is transmitted in time slots within the wireless network, the device comprising:
at least one wireless transceiver having MPR capability, the at least one wireless transceiver supporting half-duplex wireless communication;
a network coding module to perform network coding and/or network decoding for the wireless node device; and
a controller:
to receive, via the at least one wireless transceiver, at least one coded packet from one or more non-source nodes in the wireless network during a data distribution operation and to use the at least one coded packet, along with original data packets that were transmitted by at least one source node of a group of source nodes in the wireless network and previously received during the data distribution operation; and
to recover one or more data packets that previously went unreceived because the at least one wireless transceiver was transmitting during a time slot when another source node of the source nodes was transmitting the one or more data packets;
wherein the data distribution operation includes a number of the source nodes transmitting the original data packets according to the source node groups during first time slots and at least one of the one or more non-source node transmitting the at least one coded packet during at least one second time slot after the first time slots, the at least one coded packet including a linear combination of the original data packets transmitted during the first time slots.

32. The device of claim 31, wherein:
the at least one wireless transceiver includes an MPR module that is configured to support heterogeneous MPR, the at least one wireless transceiver having at least two wireless receivers following different wireless standards.

33. The device of claim 31, wherein:
the at least one coded packet includes a linear combination of all of the original data packets transmitted by the source nodes during the data distribution operation.

\* \* \* \* \*

UNITED STATES PATENT AND TRADEMARK OFFICE
CERTIFICATE OF CORRECTION

PATENT NO.         : 9,559,831 B2
APPLICATION NO.    : 14/826256
DATED              : January 31, 2017
INVENTOR(S)        : Linda M. Zeger et al.

It is certified that error appears in the above-identified patent and that said Letters Patent is hereby corrected as shown below:

In the Specification

Column 1, Line 32, delete "bandwith efficiently" and replace with --bandwith efficiency--

Column 4, Line 13-14, delete "code division, mutiple access" and replace with --code division mutiple access--

Column 5, Line 65, delete "than an nodes" and replace with --than m nodes--

Column 10, Line 31, delete "(m-1) packets" and replace with --(m-1)k packets--

Column 11, Line 35, delete "2J(J+m-1)." and replace with --2J/(J+m-1).--

Column 11, Line 50, delete "34 is FIG. 2" and replace with --34 in FIG. 2"--

Column 12, Line 55, delete "uses both" and replace with --using both--

Column 14, Line 58-59, delete "In priority based groups are used" and replace with --If priority based groups are used--

Column 15, Line 3, delete "synchronized or," and replace with --synchronized, or--

Column 15, Line 48, delete "206" and replace with --106--

Column 15, Line 51, delete "206" and replace with --106--

Signed and Sealed this
Twenty-fifth Day of June, 2019

Andrei Iancu
*Director of the United States Patent and Trademark Office*